United States Patent
Ishikawa et al.

(10) Patent No.: US 6,950,741 B2
(45) Date of Patent: Sep. 27, 2005

(54) PLANT CONTROLLER FOR FREQUENCY-SHAPING RESPONSE-DESIGNATING CONTROL HAVING A FILTERING FUNCTION

(75) Inventors: Yosuke Ishikawa, Wako (JP); Yuji Yasui, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 97 days.

(21) Appl. No.: 10/310,968

(22) Filed: Dec. 6, 2002

(65) Prior Publication Data

US 2003/0130785 A1 Jul. 10, 2003

(30) Foreign Application Priority Data

Dec. 6, 2001 (JP) .................................... 2001-373276
Jun. 18, 2002 (JP) .................................... 2002-176782
Nov. 13, 2002 (JP) .................................... 2002-329176

(51) Int. Cl.$^7$ ............................................. G06F 19/00
(52) U.S. Cl. .................... 701/110; 701/111; 701/113; 123/339.2; 123/352; 700/55; 60/284; 60/285
(58) Field of Search .......................... 701/110, 111, 701/113; 123/339.2, 352; 700/55; 60/284, 285

(56) References Cited

U.S. PATENT DOCUMENTS

| | | | | |
|---|---|---|---|---|
| 3,599,108 A | * | 8/1971 | Gardner ....................... | 333/166 |
| 5,568,142 A | * | 10/1996 | Velazquez et al. ........... | 341/126 |
| 5,662,084 A | * | 9/1997 | Deguchi et al. ........ | 123/339.11 |
| 5,857,443 A | * | 1/1999 | Kono et al. ............... | 123/339.2 |
| 6,032,166 A | * | 2/2000 | Signell et al. .................. | 708/3 |
| 6,192,311 B1 | * | 2/2001 | Yasui et al. .................. | 701/113 |

FOREIGN PATENT DOCUMENTS

JP 2000-110657 4/2000

OTHER PUBLICATIONS

Sakai et al. "Application of LLQ–Based Frequency–Shaping Control to a Magnetic Levitation System", IEEE (1998) (pp. 593–597).

* cited by examiner

Primary Examiner—Tony M. Argenbright
Assistant Examiner—Johnny H. Hoang
(74) Attorney, Agent, or Firm—Squire, Sanders & Dempsey L.L.P.

(57) ABSTRACT

A plant controller controls a plant modeled in a discrete-time system. The controller uses a frequency-shaping response-designating control algorithm having a filtering function to cause a difference between output of the plant and a target value to converge. Thus, the plant is robustly controlled without causing undesired frequency components. When the plant is an engine, the engine is modeled using a ignition timing corrective quantity as input and a rotational speed as output. The controller performs the frequency-shaping response-designating control algorithm to determine the ignition timing corrective quantity. The frequency-shaping response-designating control may be frequency-shaping sliding-mode control. In one embodiment, the control input into the plant may includes a corrective term for stabilizing an internal variable of the filter, a corrective term for stabilizing the difference between the output of the plant and the target value and a corrective term that varies depending on a switching function.

60 Claims, 27 Drawing Sheets

(a)

(b)

Control Cycle k (a)

(b)

PLANT CONTROLLER FOR FREQUENCY-SHAPING RESPONSE-DESIGNATING CONTROL HAVING A FILTERING FUNCTION

TECHNICAL FIELD

The invention relates to a plant controller for performing frequency-shaping response-designating control having a filtering function, and more specifically relates to a controller for robustly controlling rotational speed of an internal combustion engine through frequency-shaping response-designating control having a filtering function.

BACKGROUND OF THE INVENTION

When the engine is cold-started, a catalytic converter provided in an exhaust system of the engine is cold. Exhaust gases are emitted through the inactive catalytic converter. In order to avoid such a situation, rapid catalyst warming-up control for rapidly activating the catalytic converter at the start of the engine is proposed.

According to an example of the rapid catalyst warming-up control, the amount of intake air introduced into the engine is increased when the engine is in an idling state immediately after the start of the engine. The rotational speed of the engine is increased, thereby increasing the heat energy of exhaust gases generated by the engine. The increased rotational speed is feedback controlled. The feedback control manipulates ignition timing of the engine so that the rotational speed converges to a target rotational speed. As the ignition timing is more retarded, the rotational speed is more reduced. Conversely, as the ignition timing is more advanced, the rotational speed is more increased.

According to a conventional method, the above manipulation for the ignition timing is implemented with PI control. Specifically, a difference between the actual rotational speed of the engine and a target rotational speed is determined. A proportional gain and an integral gain are calculated based on the difference. Based on the proportional gain and the integral gain, a corrective quantity for the ignition timing is determined. The ignition timing corrected with the corrective quantity is applied to the engine.

In the Japanese Patent Application Unexamined Publication No. 2000-110657 assigned to the same assignee of the invention, the above manipulation for the ignition timing is implemented with sliding mode control. According to the sliding mode control, a rate of reduction of a difference between the actual rotational speed and the target rotational speed can be variably designated with a parameter.

Generally, it is desirable that the rotational speed control when the engine is in an idling state immediately after the start of the engine (hereinafter referred to as "idling rotational speed control") satisfies several requirements. First, it is desirable that the idling rotational speed control has a quick response (convergence performance) with which the actual rotational speed quickly converges to the target rotational speed. If the quick response requirement is satisfied, the catalytic converter can be quickly activated while the engine is quickly made stable. Second, it is desirable that the accuracy of the control is high. If the accuracy of the control is high, low-frequency vibrations in the rotational speed are prevented when the ignition timing is retarded. Third, it is desirable that high-frequency vibrations are suppressed. If the high-frequency vibrations are suppressed, noise that may occur inside the vehicle can be suppressed.

According to the idling rotational speed control by the above PI control, variations in the rotational speed may be different depending on whether the ignition timing is retarded or advanced. The gains of the PI control need to be adapted to operating conditions of the engine. Therefore, it is difficult to cause the actual rotational speed to converge to the target rotational speed. It is also difficult to keep the accuracy of the control at high level.

The idling rotational speed control by the above sliding mode control may cause high-frequency vibrations. In an experiment in which the rotational speed in an idling state immediately after the start of the engine was controlled according to the above sliding mode control, frequency components of the vibrations that occurred between the engine and the interior of the vehicle were measured. FIG. 35 shows resonance points of the vibration and sound transfer system in the experiment. Higher frequency components shown in a circle 500 are not directly caused by the rotational speed of the engine. These higher frequency components are caused by resonance that has occurred in the vibration and sound transfer system. Such frequency components may cause vibrations to seats, display, etc. inside the vehicle, making vehicle occupants uncomfortable.

Thus, there is a need for idling rotational speed control that has a quick response and high accuracy and that does not cause vibrations to the interior of the vehicle when the catalytic converter is quickly warmed up at the start of the engine.

Furthermore, in the sliding mode control, a switching function is determined. By bringing the value of the switching function to zero, the actual rotational speed converges to the target rotational speed. However, depending on operating conditions of the engine, it may be difficult to hold the switching function at zero. If the switching function cannot be held at zero, the entire control system may become unstable.

Thus, there is another need for control that stably causes the output of an object of the control to converge to a target value even when the switching function cannot be held at zero.

SUMMARY OF THE INVENTION

According to one aspect of the invention, a plant controller controls a plant modeled in a discrete-time system. The controller performs a frequency-shaping response-designating control algorithm having a filtering function. The algorithm causes a difference between output of the plant and a target value to converge. According to the invention, the output of the plant is robustly stabilized without causing undesired frequency components. By modeling the plant in the discrete-time system, the frequency-shaping response-designating control is easily implemented with a computer program.

According to one embodiment of the invention, the controller comprises a filter for filtering the difference between the output of the plant and the target value. The controller uses the filtered difference to perform the frequency-shaping response-designating control algorithm. Thus, the control is performed without causing undesired frequency components because the undesired frequency components are removed by the filter.

According to another embodiment, the controller uses the filtered difference to determine a switching function. The frequency-shaping response-designating control algorithm is performed using the switching function. Because the switching function is determined using the filtered difference, the robust stability of the control is improved without causing undesired frequency components.

According to another embodiment, the frequency-shaping response-designating control algorithm is a sliding mode control algorithm having a filtering function. The sliding mode control keeps the tracking capability of the plant (that is, capability of the output of the plant to follow the target value) at high level even when there are disturbances, modeling errors, and dead time of the plant.

According to another embodiment, an equivalent control input term as control input into the plant is calculated using an internal variable of the filter. The equivalent control input term compensates a phase lag that may be caused by the filtering, improving the stability of the control.

According to another embodiment, a reaching law input term as control input into the plant is calculated based on the value of the switching function. The reaching law input term places a controlled quantity on the switching function to cause the controlled quantity to converge to the target value.

According to another embodiment, an adaptive law input term as control input into the plant is calculated based on an integrated value of the switching function. The adaptive law input term allows a steady-state error between the output of the plant and the target value to converge.

According to another aspect of the invention, control input into the plant includes a corrective term for stabilizing an internal variable of the filter. The plant is controlled without oscillating the internal variable even when the value of the switching function can not be held at zero.

According to another embodiment, the control input further includes a corrective term for stabilizing the difference between the output of the plant and the target value. Therefore, the difference stably converges even when the value of the switching function can not be held at zero.

According to another embodiment, the control input further includes a corrective term that varies depending on the switching function. Therefore, even when the value of the switching function can not be held at zero, the difference stably converges while the value of the switching function gradually approaches zero.

According to another embodiment, the control input further includes a corrective term that varies depending on an integrated value of the switching function. Thus, the difference stably converges while the value of the switching function gradually approaches zero.

According to another embodiment, each of the corrective terms is determined by an optimal regulator. The optimal regulator adjusts the degree of convergence of a state variable corresponding to each corrective term so that the control system is stabilized.

According to another aspect of the invention, a state equation is defined. The state equation includes an internal variable of the filter, the difference between the output of the plant and the target value, and the value of the switching function as linear independent state variables. Corrective terms for causing the state variables to converge are determined based on the state equation. The control input includes the corrective terms. An integrated value of the switching function may be included as a linear independent state variable. Thus, each of the state variables converges without making the control system unstable even when the value of the switching function cannot be held at zero.

According to another aspect of the invention, the plant is an engine. The output of the plant is rotational speed of the engine. The difference between the output of the plant and the target value is a difference between the rotational speed of the engine and a target rotational speed. Thus, the rotational speed of the engine robustly converges to the target rotational speed without causing undesired frequency components.

According to one embodiment of the invention, the plant is modeled using a corrective quantity for ignition timing of the engine as control input and rotational speed of the engine as control output. The controller performs the frequency-shaping response-designating control algorithm to determine the ignition timing corrective quantity. Thus, the response of the rotational control for the engine is improved.

According to another embodiment, the filter is a low-pass filter. The control is performed without causing undesired high frequency components.

According to another embodiment, a cutoff frequency of the filter is set to a frequency below a resonance point of a vibration and sound transfer system between the engine and the interior of the vehicle. Thus, frequency components that may cause the resonance are removed from the rotational speed control.

According to another embodiment, the filter is represented by state space representation. Thus, the internal variable of the filter can be used for calculating the control input.

According to another embodiment, the filter is implemented with a computer program. The internal variable of the filter can be easily passed to the control algorithm. The frequency-shaping response-designating control may be implemented with a computer program. Thus, the control is implemented with ease and high accuracy.

According to another embodiment, the frequency-shaping response-designating control algorithm is performed when the engine is in an idling state. Thus, the tracking capability of the plant in the idling state is improved. The response, stability and robustness of the idling rotational speed control are improved.

According to another embodiment, the frequency-shaping response-designating control algorithm is performed in warming-up control for an exhaust system. In the warming-up control, the amount of intake air introduced into the engine is increased so as to quickly activate a catalyst converter at the start of the engine. Thus, the catalyst converter is quickly activated while the response, stability and robustness of the control are maintained at high level.

DESCRIPTION OF THE PREFERRED EMBODIMENTS

Overview of Internal Combustion Engine and Controller

Figure 1:
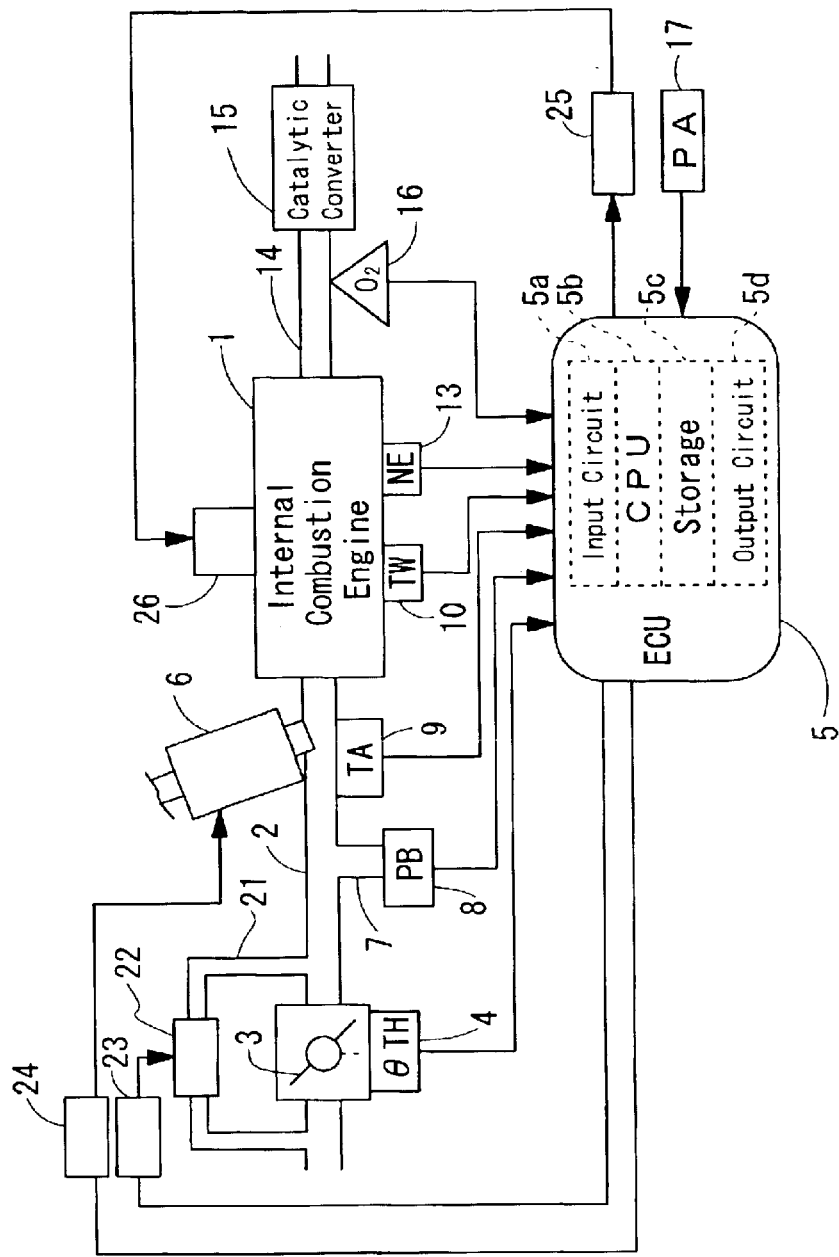
FIG. 1 schematically illustrates an internal combustion engine and its controller according to one embodiment of the invention.

Preferred embodiments of the present invention will be described referring to attached drawings. FIG. 1 is a block diagram showing a controller of an internal-combustion engine (hereinafter referred to as an engine) in accordance with one embodiment of the invention.

An electronic control unit (hereinafter referred to as an ECU) 5 comprises an input circuit 5a for receiving data sent from each part of the engine 1, a CPU 5b for carrying out operations for controlling each part of the engine 1, a storage device 5c including a read only memory (ROM) and a random access memory (RAM), and an output circuit 5d for sending control signals to each part of the engine 1. Programs and various data for controlling each part of the vehicle are stored in the ROM. A program for implementing rotational speed control for the engine, data and tables used for operations of the program are stored in the ROM. The ROM may be a rewritable ROM such as an EEPROM. The RAM provides work areas for operations by the CPU 5a, in which data sent from each part of the engine 1 as well as control signals to be sent out to each part of the engine 1 are temporarily stored.

The engine is, for example, an engine equipped with four cylinders. An intake manifold 2 is connected to the engine 1. A throttle valve 3 is disposed upstream of the intake manifold 2. A throttle valve opening (θTH) sensor 4, which is connected to the throttle valve 3, outputs an electric signal corresponding to an opening angle of the throttle valve 3 and sends it to the ECU 5.

A bypass passage 21 for bypassing the throttle valve 3 is provided in the intake manifold 2. A bypass valve 22 for controlling the amount of air to be supplied into the engine 1 (hereinafter referred to as an intake air amount) is provided in the bypass passage 21. The bypass valve 22 is driven by a bypass valve actuator 23. The ECU 5 supplies a signal indicating an opening angle of the bypass valve to the actuator 23 to control the opening angle of the bypass valve 22.

A fuel injection valve 6 is provided for each cylinder at an intermediate point in the intake manifold 2 between the engine 1 and the throttle valve 3. The fuel injection valve 6 is connected to a fuel pump (not shown) to receive fuel supplied from a fuel tank (not shown). The fuel injection valve 6 is driven by a fuel injection valve actuator 24. The ECU 5 supplies a signal indicating opening time of the fuel injection valve to the fuel injection actuator 24 to control the opening time of the fuel injection valve 6.

An intake manifold pressure (Pb) sensor 8 and an intake air temperature (Ta) sensor 9 are mounted in the intake manifold 2 downstream of the throttle valve 3. These sensors convert the intake manifold pressure and intake air temperature into electrical signals, and send these signals to the ECU 5.

An engine water temperature (TW) sensor 10 is attached to the cylinder peripheral wall, which is filled with cooling water, of the cylinder block of the engine 1. The sensor 10 detects the temperature of the engine cooling water. The detected engine water temperature is converted into an electrical signal, and the signal is sent to the ECU 5.

A rotational speed (Ne) sensor 13 is attached to the periphery of the camshaft or the periphery of the crankshaft (not shown) of the engine 1, and outputs a CRK signal pulse at a predetermined crank angle cycle (for example, a cycle of 30 degrees) that is shorter than a TDC signal pulse cycle issued at a crank angle cycle associated with a TDC position of the piston. The CRK pulses are counted by the ECU 5 to determine the rotational speed Ne of the engine 1.

The engine 1 has an exhaust manifold 14. Exhaust gases are discharged via a ternary catalyst 15 constituting an exhaust gas cleansing device, which is installed at an intermediate point in the exhaust manifold 14. An exhaust gas sensor 16 mounted at an intermediate point in the exhaust manifold 14 is an exhaust density sensor for detecting oxygen density in the exhaust gas. The detected signal is sent to the ECU 5.

A spark plug 26 is provided in the combustion chamber (not shown) of the engine 1. The spark plug 26 is electrically connected to the ECU 5 through an igniter 25. The ECU 5 supplies a signal indicating ignition timing to the igniter 25 to ignite the spark plug 26, combusting air-fuel mixture in the combustion chamber.

An atmospheric pressure (Pa) sensor 17 is connected to the ECU 5. The sensor detects the atmospheric pressure, converts it to an electric signal, and then sends it to the ECU 5.

Signals sent to the ECU 5 are passed to the input circuit 5a. The input circuit 5a shapes the input signal waveforms, corrects the voltage levels to specified levels, and converts analog signal values into digital signal values. The CPU 5b processes the resulting digital signals, performs operations in accordance with the programs stored in the storage device 5c, and creates control signals. The output circuit 5d sends these control signals to the fuel injection valve actuator 24, igniter 25, and other actuators.

Behavior at the Start of the Engine

Figure 2:
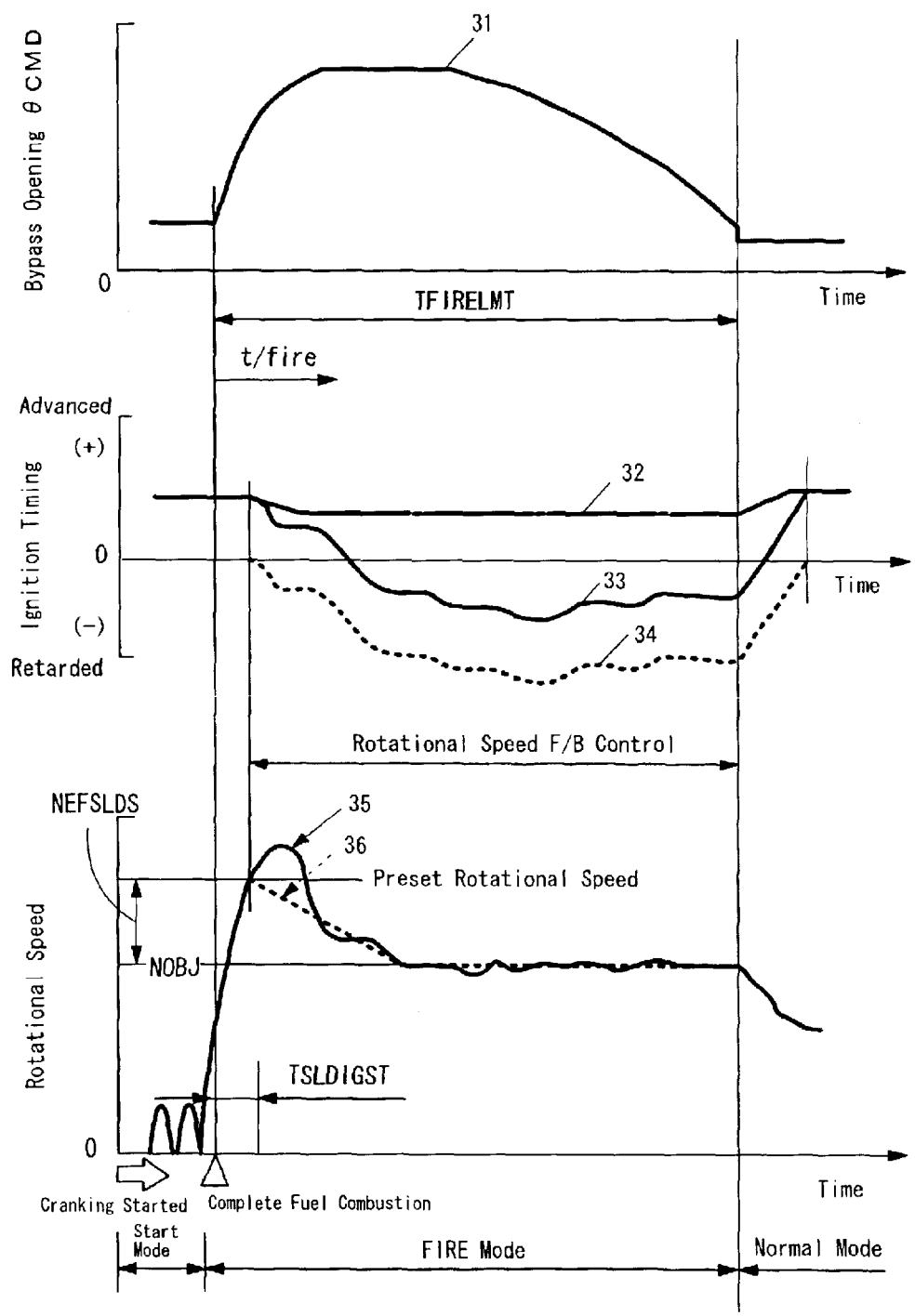
FIG. 2 illustrates operation modes at the start of an engine according to one embodiment of the invention.

Referring to FIG. 2, basic operations performed by a control system in accordance with one embodiment of the invention will be described. FIG. 2 shows an example of transition of opening of the bypass valve 22 (hereinafter referred to as "bypass opening") θCMD, ignition timing and rotational speed when the engine 1 is started.

A curve 31 shows transition of the bypass opening θCMD generated by the control system in accordance with one embodiment of the invention. The bypass valve 22 (FIG. 1) is driven in accordance with the bypass opening θCMD. A curve 34 shows transition of a corrective quantity DIG for the ignition timing generated by the control system in accordance with one embodiment of the invention. A basic value igbase (indicated by a curve 32) is corrected with the corrective quantity DIG to determine an ignition timing signal iglog (indicated by a curve 33). The basic value igbase indicates the ignition timing signal in a normal operation mode (that is, an operation mode other than a FIRE mode) of the engine 1, and has an advanced value. The spark plug 26 (FIG. 1) is driven in accordance with the ignition timing signal iglog.

A curve 35 shows transition of an actual rotational speed Ne of the engine, which varies depending on changes in the bypass opening θCMD and the ignition timing iglog. A curve 36 shows transition of a target rotational speed ne/fire that is established by the control system. The target rotational speed ne/fire decreases from a preset rotational speed (which is higher than a final target rotational speed NOBJ by a predetermined value NEFSLDS) toward the final target rotational speed NOBJ. After the target rotational speed ne/fire has reached the final target rotational speed NOBJ, it is held at NOBJ. The final target rotational speed NOBJ is predetermined as a rotational speed to be finally held in the FIRE mode. The final target rotational speed NOBJ is selected to be higher than a rotational speed in an idling state of a normal mode (that is, an operation mode other than the FIRE mode).

The system shown in FIG. 1 enters a start mode when the engine 1 is cranked with a starter motor (not shown). The start mode in the example shown in FIG. 2 indicates an idling state in which the accelerator pedal (not shown) is not depressed. In this state, the opening of the throttle valve 4 is nil and accordingly intake air is supplied to the combustion chamber only through the bypass valve 22. When complete fuel combustion in the engine 1 is confirmed in the start mode, the operation mode shifts to the FIRE mode for quickly activating the catalytic converter 15. The engine 1 continues to be in the idling state.

In the FIRE mode, a bypass opening θCMD greater than in an idling state of the normal mode is generated. The heat energy of the exhaust gasses discharged into the exhaust system is almost proportional to the intake air amount. Therefore, the bypass opening θCMD is generated in such a manner that intake air is introduced sufficiently to increase the temperature of the catalytic converter and activate it within a limit time TFIRELMT in the FIRE mode.

As the amount of the intake air increases in the FIRE mode, the actual rotational speed Ne rises, as indicated by the curve 35. When the actual rotational speed Ne reaches the preset rotational speed, feedback control for the engine rotational speed is started. The rotational speed control calculates the ignition timing corrective quantity DIG as shown in the curve 34 so that the actual rotational speed Ne converges to the target rotational speed ne/fire. The basic value igbase for the ignition timing is corrected with the calculated corrective quantity DIG to determine the ignition timing signal iglog.

As seen from the curve 35, the rotational speed Ne exceeds the target rotational speed ne/fire because of the increased amount of the intake air. Therefore, the corrective quantity DIG for the ignition timing has a value ($\leq 0$) for making the ignition timing retarded from the basic value igbase, as indicated by the curve 34. As a result, the ignition timing signal iglog has a retarded value, as indicated by the curve 33. The spark plug 26 of the engine 1 (FIG. 1) is activated in accordance with the calculated ignition timing signal iglog. Thus, the actual rotational speed Ne of the engine 1 converges to the target rotational speed ne/fire, as indicated by the curve 35.

Thus, in the FIRE mode performed in an idling state after the start of the engine 1, the rotational speed Ne is controlled to reach the target rotational speed ne/fire (eventually to the final target rotational speed NOBJ) by increasing the amount of intake air as well as controlling the ignition timing to be retarded. Accordingly, the heat energy of the exhaust gasses generated by the combustion of air-fuel mixture in the combustion chamber becomes more than in an idling state of the normal mode. By virtue of the exhaust gasses with the increased heat energy, the catalytic converter 15 is quickly activated, allowing a desired exhaust gas purification to be performed. At the same time, the rotational speed control allows the increased rotational speed caused by the increased amount of the intake air to be maintained at an appropriate value.

Here, an elapsed time after the operation mode shifts to the FIRE mode is represented by "t/fire". The FIRE mode is continuously carried out until t/fire reaches the predetermined limit time TFIRELMT. After the FIRE mode has been finished, the operation mode shifts to the normal mode in which the engine 1 normally operates. In the normal mode, the bypass opening θCMD is controlled, for example, to be an opening for a normal idling state of the engine 1 (that is, an opening in the normal mode is smaller than an opening in the FIRE mode). The ignition timing is gradually returned to a normal advanced value that is determined by the basic value igbase, as indicated by the curve 33.

During the FIRE mode, if the engine 1 needs to operate in a state other than an idling state (for example, when the accelerator pedal is depressed), the control system interrupts the FIRE mode to exit the FIRE mode. In order to ensure that the catalytic converter 3 is activated by its temperature increase, the increase of the intake air amount by controlling the bypass opening continues. However, in order to achieve a desired power output of the engine 1, the ignition timing is returned to a normal advanced ignition timing determined by the basic value igbase.

One embodiment in which the rotational speed control is performed with an increase of the intake air amount will be described below. However, the rotational speed control according to the invention may be performed without increasing the intake air amount.

Overall Structure of Control System

Figure 3:
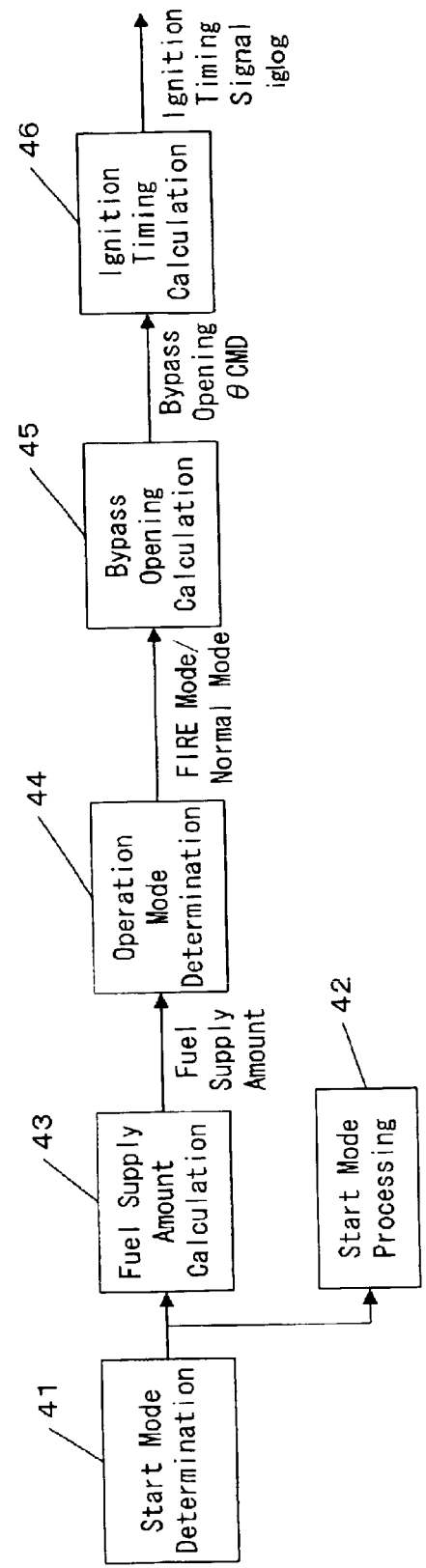
FIG. 3 schematically shows a block diagram for a control system in accordance with one embodiment of the invention.

FIG. 3 is a functional block diagram of a control system in accordance with one embodiment of the invention. These functional blocks are typically implemented with computer programs.

A start mode determination part 41 determines whether the operation mode of the engine 1 is the start mode shown in FIG. 2. This determination is carried out by confirming complete combustion as described above. The confirmation may be performed based on the detected engine rotational speed Ne. If it is determined to be the start mode by the start mode determination part 41, a start mode processing part 42 performs a start mode process. In order to start the engine 1, this process refers to tables and equations, which are pre-stored in the storage device 5c (FIG. 1), based on values detected by the various sensors shown in FIG. 1 to determine ignition timing; fuel amount to be supplied, and bypass opening. The spark plug 26, fuel injection valve 6 and bypass valve 22 are driven in accordance with the determined ignition timing, fuel supply amount and bypass opening.

If the start mode determination part 41 determines that the operation mode is not the start mode, a fuel supply amount calculation part 43 refers to tables and equations, which are pre-stored in the storage device 5c, based on values detected by the various sensors shown in FIG. 1 to calculate fuel amount to be supplied to the engine 1. An operation mode determination part 44 determines which mode, either FIRE mode or normal mode shown in FIG. 2, should be performed.

A bypass opening calculation part 45 generates the bypass opening θCMD for implementing quick activation of the catalytic converter 15 as shown in FIG. 2. The heat energy of exhaust gasses introduced into the catalytic converter 15 is almost proportional to the intake air amount. Therefore, the bypass opening calculation part 45 calculates the bypass opening θCMD by performing feedback control on the intake air amount. This control will be hereinafter referred to as "intake air amount control". Performing the intake air amount control eliminates variations in the temperature increase of the catalytic converter 15. In this embodiment, sliding mode control described later is used for the intake air amount control.

An ignition timing calculation part 46 generates the ignition timing signal iglog for causing the actual rotational speed Ne to converge to the target rotational speed ne/fire as shown in FIG. 2. The ignition timing calculation part 46 calculates the ignition timing iglog by performing feedback control on the engine rotational speed. This control will be hereinafter referred to as "rotational speed control". In this embodiment, frequency-shaping sliding-mode control described later is used for the rotational speed control.

Structure of Intake Air Amount Control

Figure 4:
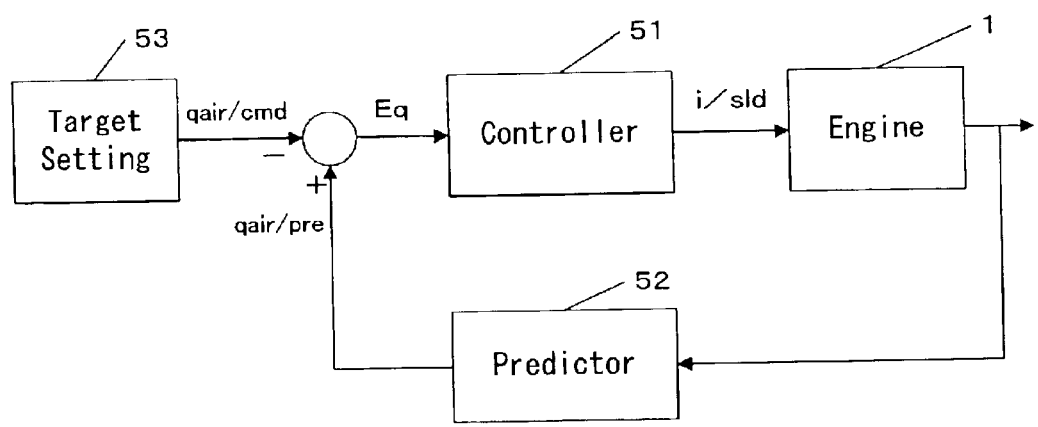
FIG. 4 shows a control block diagram for intake air amount control in accordance with one embodiment of the invention.

FIG. 4 is a control block diagram for the intake air amount control in accordance with one embodiment of the invention. The engine 1 is an object to be controlled by the intake air amount control. The object of the control may be referred to as a "plant". A predictor 52 predicts an integrated value of an actual intake air amount introduced into the engine 1 (hereinafter referred to as a "predicted integrated intake air amount qair/pre"). A target setting means 53 establishes a target value for the integrated intake air amount (hereinafter referred to as a "target integrated intake air amount qair/cmd"). The predicted integrated intake air amount qair/pre is compared with the target integrated intake air amount qair/cmd. A controller 51 determines a corrective quantity i/sld for the bypass opening based on the result of the comparison. The bypass valve 22 of the engine 1 is driven in accordance with the bypass opening θCMD corrected with the corrective quantity i/sld. The integrated value of the actual intake air amount qair/pre introduced into the engine 1 is predicted again by the predictor 52. Thus, the controller 51 performs feedback control to determine the corrective quantities i/sld for the bypass opening so that the predicted integrated intake air amount qair/pre converges to the target integrated intake air amount qair/cmd.

Specific calculation to be performed by the predictor 52, the target setting means 53 and the controller 51 will be described below. The calculation is typically performed with computer programs.

The predictor 52 predicts an intake air amount gair/pre that is actually introduced into the engine 1 per control cycle in accordance with the equation (1). Ga1 indicates a predetermined value.

$$\text{gair/pre} = Pb \cdot Ga1 \tag{1}$$

The predicted intake air amount gair/pre determined by the equation (1) is added to the predicted integrated intake air amount qair/pre(k−1) calculated in the previous cycle, to determine the predicted integrated intake air amount qair/pre(k) for the current cycle. k is an identifier for identifying the control cycle. (k) indicates the current cycle and (k−1) indicates the previous cycle.

$$qair/pre(k)=qair/pre(k-1)+gair/pre(k) \tag{2}$$

The target setting means 53 calculates a standard opening θ0 under the condition in which an optimal amount of intake air is supplied to achieve quick activation of the catalytic converter 15. The standard opening θ0 is determined by correcting a value obtained by referring to a predefined data table based on the engine water temperature Tw with a value based on the FIRE mode elapsed time t/fire, which will be described in detail later.

A target intake air amount per cycle gair/cmd is determined as an intake air amount corresponding to the standard opening θ0 in accordance with the equation (3). 1/Ne indicates time per cycle (that is, 1 TDC). Ga2 is a constant determined in accordance with standard atmospheric pressure, standard intake air temperature and standard intake manifold pressure.

$$gair/cmd = \theta 0 \cdot \frac{1}{Ne} \cdot Ga2 \tag{3}$$

The target intake air amount determined by the equation (3) is added to the target integrated intake air amount qair/cmd(k−1) calculated in the previous cycle to determine the target integrated intake air amount qair/cmd(k) for the current cycle.

$$qair/cmd(k)=qair/cmd(k-1)+gair/cmd(k) \tag{4}$$

The intake air amount control performed by the controller 51 will be described. In the embodiment, the intake air amount control is implemented with response-designating control in which a desired rate of reduction can be designated. More specifically, the intake air amount control is implemented by using sliding mode control as the response-designating control.

The engine 1, which is the object to be controlled, can be modeled using the bypass opening Θ as input, and the integrated intake air amount qair/pre as output. The engine 1 is modeled as a discrete-time system model. Such modeling can make the algorithm of the intake air amount control simple and suitable for computer processing.

$$qair/pre(k+1)=a1 \cdot qair/pre(k)+a2 \cdot qair/pre(k-1)+b1 \cdot \Theta(k) \tag{5}$$

a1, a2 and b1 are model parameters determined in accordance with atmospheric pressure Pa, intake air temperature Ta, rotational speed Ne, etc. As shown in the equation (5), the predicted integrated intake air amount qair/pre(k+1) for the next cycle can be expressed by using the predicted integrated intake air amount qair/pre (k) in the current cycle, the predicted integrated intake air amount qair/pre(k−1) in the previous cycle and the bypass opening Θ in the current cycle.

In order to perform the sliding mode control, a switching function $\sigma_1$ is established as shown in the equation (6). Eq indicates a difference between the predicted integrated intake air amount and the target integrated intake air amount (the difference will be hereinafter referred to as an "intake air amount error"). pole/i is a setting parameter for the switching function $\sigma_1$. The setting parameter is set to satisfy −1<pole/i<1.

$$\sigma_1(k)=pole/i \cdot Eq(k-1)+Eq(k) \tag{6}$$

The equation in the case of $\sigma_1(k)=0$ is called an equivalent input system, which specifies convergence characteristics of the intake air amount error Eq, or controlled quantity. Assuming $\sigma_1(k)=0$, the equation (6) is transformed to the equation (7).

$$Eq(k)=-pole/i \cdot Eq(k-1) \tag{7}$$

Figure 5:
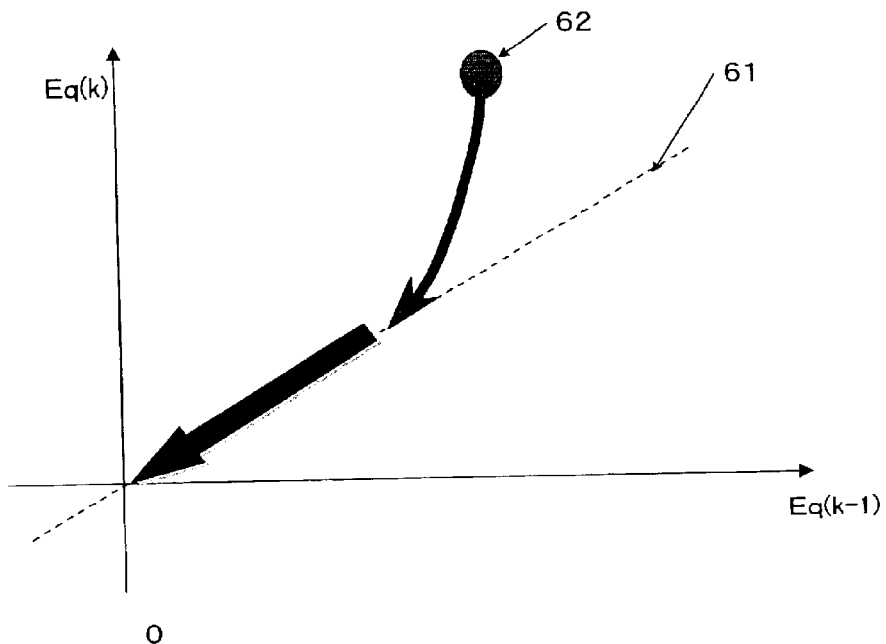
FIG. 5 schematically illustrates a switching line in sliding mode control in accordance with one embodiment of the invention.

Now, characteristics of the switching function $\sigma_1$ will be described with reference to FIG. 5 and the equation (7). FIG. 5 shows that the equation (7) is shown as a line 61 on a phase space with Eq(k−1) on the horizontal axis and Eq(k) on the vertical axis. The line 61 is referred to as a switching line. It is assumed that an initial value of a state quantity (Eq(k−1), Eq(k)) that is a combination of Eq(k−1) and Eq(k) is shown by a point 62. The sliding mode control operates to place the state quantity shown by the point 62 on the line 61 and then restrain it on the line 61. According to the sliding mode control, since the state quantity is held on the switching line 61, the state quantity can highly stably converge to the origin 0 of the phase space without being affected by disturbances or the like. In other words, by restraining the state quantity (Eq(k−1), Eq(k)) on such a stable system having no input shown by the equation (7), the predicted integrated intake air amount qair/pre can converge to the target integrated intake air amount qair/cmd robustly against disturbances and modeling errors.

In the embodiment, since the phase space in which the switching function $\sigma_1$ is represented is two-dimensional, the switching line is a straight line. If the phase space is three-dimensional, the switching line is expressed by a plane. If the phase space is four-dimensional or n-dimensional where n is greater than four, the switching line is expressed by a hyperplane.

The switching function setting parameter pole/i is a parameter which can be variably selected. Reduction (convergence) characteristics of the intake air amount error Eq can be specified by the setting parameter pole/i.

Figure 6:
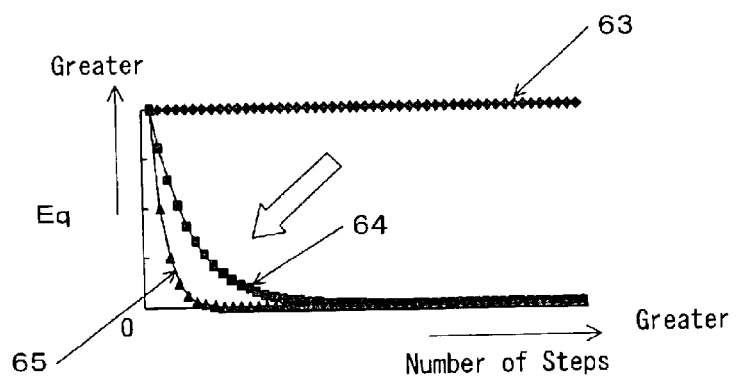
FIG. 6 illustrates a response of a controlled quantity that varies depending on a setting parameter of a switching function in sliding mode control according to one embodiment of the invention.

FIG. 6 is an example showing response-designating characteristics of sliding mode control. A line 63 indicates the response characteristics when the value of pole/i is "−1". A curve 64 indicates the response characteristics when the value of pole/i is "−0.8". A curve 65 indicates the response characteristics when the value of pole/i is "−0.5". As seen, a rate of convergence of the intake air amount error Eq changes depending on the value of pole/i. It should be understood that the convergence rate becomes faster as the absolute value of pole/i becomes smaller.

In order to cause the predicted integrated intake air amount qair/pre to converge to the target integrated intake air amount qair/cmd, the controller 51 determines the control input Θ (i.e., the bypass opening) that is to be input into the modeled object shown by the equation (5). The control input Θ is determined by summing an equivalent control input Θeq, a reaching law input Θrch and an adaptive law input Θadp.

The equivalent control input Θeq is an input for restraining the state quantity (Eq(k), Eq(k−1)) on the switching line. Therefore, determining Θeq requires satisfying $\sigma_1(k)=\sigma_1(k-1)$. Based on the equation and the above model equation (5), the control input Θ is determined according to the equation (8).

$$\Theta eq(k) = \frac{-1}{b1}[((a1-1) + pole/i) \cdot Eq(k)) + (a2 - pole/i) \cdot Eq(k-1)] + \quad (8)$$
$$\frac{-1}{b1}[-qair/cmd(k+1) + a1 \cdot qair/cmd(k) + a2 \cdot qair/cmd(k-1)]$$

As seen from the equation (8), the first bracket is a feedback term based on the intake air amount error Eq and the second bracket is a feed-forward term based on the target integrated intake air amount qair/cmd. The feed-forward term is an input to be given to the object in a state in which the intake air amount error Eq is steadily zero. On the other hand, as described above, the standard opening θ0 is a bypass opening for defining the target integrated intake air amount qair/cmd. In other words, the standard opening θ0 is established in a feed-forward manner so that an intake air amount corresponding to the standard opening θ0 is uniquely determined to be a target value thereof. Therefore, the feed-forward term can be replaced with the standard opening θ0.

In the embodiment, the feedback term is omitted. According to studies conducted by the inventors of the present invention, the stability of the intake air amount control is very high in a state in which the state quantity is present in the vicinity of the switching line. Furthermore, since the adaptive law input, which will be described later, is used in the embodiment, the stability of the convergence of the state quantity to the switching line is enhanced. Accordingly, the stability of the intake air amount control is not practically impaired even if the feedback term is omitted. Thus, the equivalent control input Θeq is determined according to the equation (9).

$$\Theta eq = \theta 0 \quad (9)$$

The reaching law input Θrch and the adaptive law input Θadp are determined in accordance with the equations (10) and (11), respectively. Fx and Fy are coefficients for specifying a gain for the reaching law and a gain for the adaptive law, respectively. These values are pre-identified through, for example, simulation in which the stability and quick response of the convergence of the value of the switching function $\sigma_1$ to zero are taken into consideration.

$$\Theta rch(k) = -Fx \cdot \sigma_1(k) \quad (10)$$

$$\Theta adp(k) = -Fy \cdot \sum_{i=0}^{k} \sigma_1(i) \quad (11)$$

Thus, the bypass opening Θ is determined as shown by the equation (12).

$$\Theta = \theta 0(k) + \Theta rch(k) + \Theta adp(k) \quad (12)$$
$$= \theta 0(k) - \left[ Fx \cdot \sigma_1(k) + Fy \sum_{i=0}^{k} \sigma_1(i) \right]$$

The reaching law input Θrch and the adaptive law input Θadp are added to determine the corrective quantity i/sld. The standard opening θ0 is corrected with the corrective quantity i/sld to determine the bypass opening Θ or the control input. The bypass opening θCMD is determined based on the bypass opening Θ thus determined.

Figure 7:
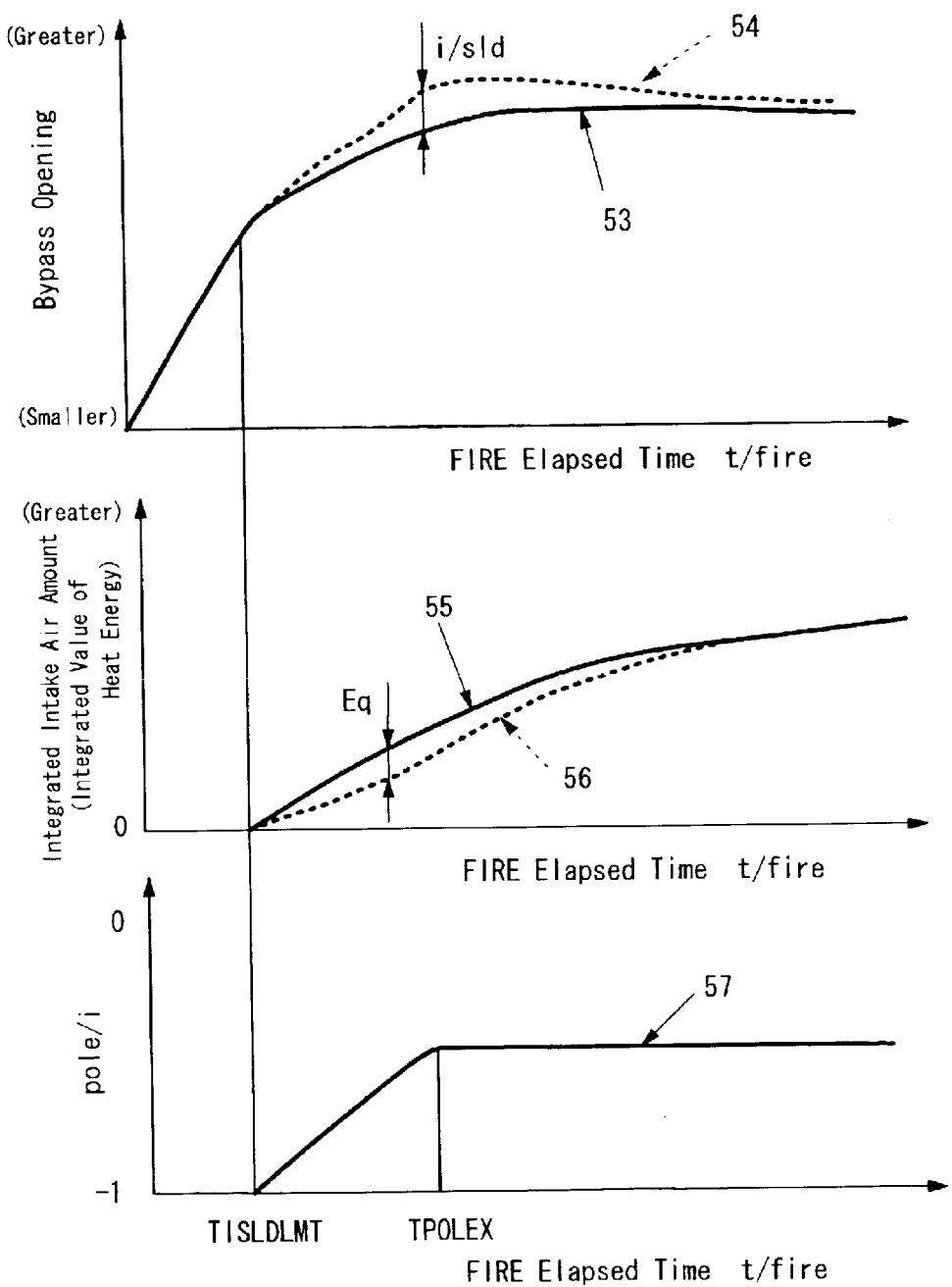
FIG. 7 schematically illustrates behavior of intake air amount control in accordance with one embodiment of the invention.

FIG. 7 shows an example of behavior of the intake air amount control. The origin of the time axis indicates the start time of the FIRE mode. A curve 53 shows transition of the standard bypass opening θ0. The standard bypass opening θ0 is, as described above, a bypass opening for defining the intake air amount to be introduced to appropriately activate the catalytic converter in the FIRE mode. A curve 55 shows transition of the target integrated intake air amount qair/cmd determined based on the standard bypass opening θ0. The target integrated intake air amount qair/cmd indicates a target of the integrated value of heat energy given to the catalytic converter. A curve 56 shows transition of the predicted integrated intake air amount qair/pre determined by predicting heat energy actually given to the catalytic converter. A curve 54 shows transition of the value Θ determined by correcting the standard bypass opening θ0 (curve 53) with the corrective quantity i/sld determined in the sliding mode control. The sliding mode control is performed based on the error Eq between the target integrated intake air amount qair/cmd and the predicted integrated intake air amount qair/pre. A curve 57 shows transition of the setting parameter pole/i of the switching function $\sigma_1$.

When the FIRE mode is started, the bypass opening calculation part 45 (FIG. 3) increases the intake air amount. At this time, the target and predicted integrated intake air quantities qair/cmd and qair/pre are forcibly set to zero so as to prevent the standard opening θ0 from being corrected until a predetermined time TISLDLMT elapses after the start of the FIRE mode. This is because reliability of the predicted and target integrated intake air amounts is considered to he poor immediately after the increase of the intake air amount has started. After the time TISLDLMT has elapsed, the bypass opening calculating part 45 calculates the error Eq between the target integrated intake air amount qair/cmd and the predicted integrated intake air amount qair/pre in each control cycle. The sliding mode control is performed in the above-described manner so that the error converges to zero.

The bypass opening calculation part 45 determines the control input of the switching function $\sigma_1$ so that the value of the switching function $\sigma_1$ shown in the equation (6) becomes zero, thereby obtaining the corrective quantity i/sld. Then, the corrective quantity i/sld is added to the standard bypass opening θ0. Transition of the value Θ thus determined is shown by the curve 54. The bypass opening θCMD is determined based on the Θ.

On the other hand, as shown by the curve 57, the bypass opening calculation part 45 gradually increases the setting parameter pole/i of the switching function $\sigma_1$ from −1 until the time TPOLEX elapses. After the time TPOLEX has elapsed, the setting parameter pole/i is held to be constant. In other words, the rate of reduction of the error Eq before the time TPOLEX is set to be slower than the rate of reduction of the error Eq after the time TPOLEX. Thus, abrupt changes in the intake air amount are avoided, allowing a steady combustion state immediately after the start of the engine 1 to be maintained.

As described above with reference to FIG. 2, an increase of the intake air amount is performed with more retarded ignition timing than normal ignition timing. When a manner of the increase is inappropriate, combustion and emission states of the engine 1 may deteriorate. By calculating the bypass opening θCMD based on the standard opening θ0, a stable idling state can be realized without impairing combustion and emission states of the engine 1.

Structure of Rotational Speed Control

Figure 8:
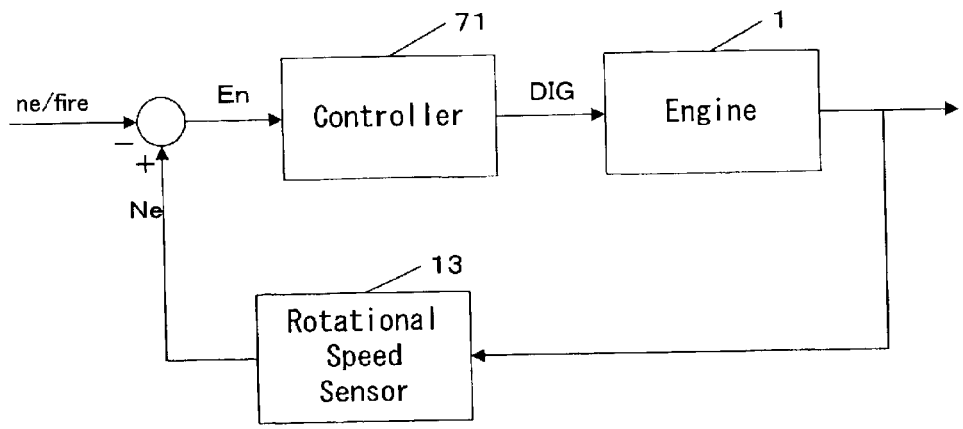
FIG. 8 shows a control block diagram for rotational speed control in accordance with one embodiment of the invention.

FIG. 8 is a control block diagram of the rotational speed control in accordance with one embodiment of the invention. In the embodiment, the rotational speed control is implemented with frequency-shaping response-designating control in which a desired reduction rate can be designated and frequency shaping is taken into consideration. More specifically, the rotational speed control is implemented using frequency-shaping sliding-mode control as the frequency-shaping response-designating control.

As shown in FIG. 8, in accordance with the embodiment, an object (that is, a plant) of the frequency-shaping sliding-mode control is the engine 1. The actual rotational speed Ne of the engine 1 is detected by the rotational speed sensor 13 (FIG. 1). The detected actual rotational speed Ne is compared with the target rotational speed ne/fire. The controller 71 determines the corrective quantity DIG for ignition timing based on the result of the comparison. Ignition operation of the engine 1 is performed in accordance with the ignition timing iglog corrected with the ignition timing corrective quantity DIG. Then, the actual rotational speed Ne of the engine 1 is detected again by the rotational speed sensor 13.

Thus, the controller 71 performs feedback control for determining the ignition timing corrective quantity DIG so that the actual engine rotational speed Ne converges to the target rotational speed ne/fire. The engine 1 or the object can be modeled using the ignition timing corrective quantity DIG as input and the engine rotational speed Ne as output, as shown in the equation (13). The engine is modeled as a discrete-time system model. Such modeling makes the algorithm of the rotational speed control simple and suitable for computer processing.

$$En(k+1)=a3 \cdot En(k)+a4 \cdot En(k-1)+b2 \cdot DIG(k-d) \text{ Where } En(k)=Ne(k)-ne/\text{fire} \quad (13)$$

k is an identifier for identifying the control cycle. (k) indicates the current cycle. (k−1) indicates the previous cycle. (k+1) indicates the next cycle. En indicates a difference between the actual rotation speed Ne and the target rotational speed ne/fire (the difference will be hereinafter referred to as a "rotational speed error"). d indicates dead time. a3, a4 and b2 are model parameters and are pre-identified with simulation or the like so that behavior characteristics of the control model match the actual behavior characteristics of the engine.

As shown in the equation (13), the rotational speed error En(k+1) for the next cycle can be represented by using the rotational speed error En(k) in the current cycle, the rotational speed error En(k−1) in the previous cycle and the ignition timing corrective quantity DIG in the current cycle.

Figure 9:
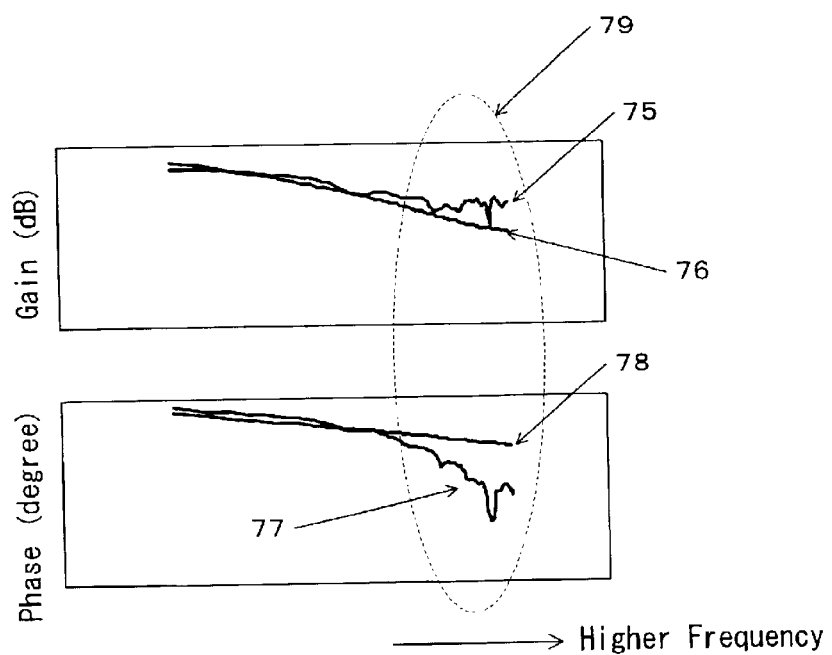
FIG. 9 illustrates capability of a modeled object to follow an actual object in accordance with one embodiment of the invention.

FIG. 9 shows frequency characteristics of the actual engine and the engine modeled in the above-described manner. Curves 75 and 77 indicate the frequency characteristics of the actual engine. Curves 76 and 78 indicate the frequency characteristics of the engine modeled according to the equation (13). It is seen that the model follows the actual engine except for a higher frequency region surrounded by an oval 79. In other words, in a frequency region including frequency components lower than a predetermined frequency, the controller 71 can be configured utilizing the above-described model. It is also seen that, in a frequency region including frequency components greater than the predetermined frequency, modeling errors are included. The frequency-shaping sliding-mode in accordance with the invention comprises removing such higher frequency components in the frequency characteristics of the actual engine.

First Embodiment of Controller in Rotational Speed Control

Figure 10:
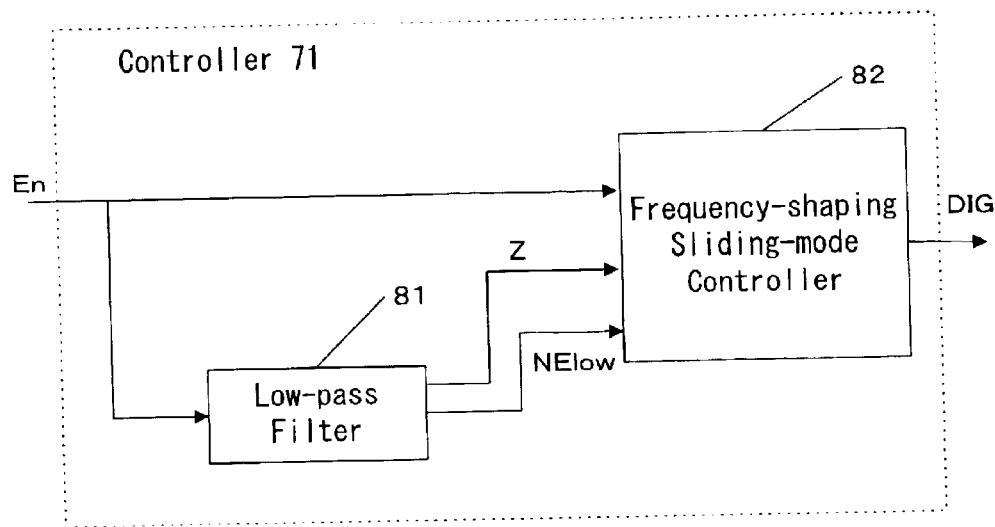
FIG. 10 shows a block diagram of a controller for rotational speed control in accordance with one embodiment of the invention.

FIG. 10 is a detailed block diagram for the controller 71 shown in FIG. 8 in accordance with a first embodiment of the invention. The controller 71 further comprises a low-pass filter 81 and a frequency-shaping sliding mode controller (hereinafter referred to as a "sliding mode controller") 82. The error En between the actual rotational speed Ne detected by the rotational sensor 13 and the target rotational speed ne/fire is passed to the low-pass filter 81. The low-pass filter 81 removes higher frequency components from the rotational speed error En to generate a signal NElow.

The sliding mode controller 82 receives the rotational speed error En, a state variable (which is also referred to as an internal variable) Z of the low-pass filter 81, and the signal NElow generated by the low-pass filter 81. The sliding mode controller 82 performs sliding mode control to determine the ignition timing corrective quantity DIG so that the rotational speed error converges to zero.

Specific calculation to be performed by the low-pass filter 81 and the sliding controller 82 will be described. The calculation is typically implemented with computer programs.

Using state space representation which is well known to those skilled in the art, the low-pass filter 81 can be represented by a state equation shown by the equation (14) and an output equation shown by the equation (15).

$$Z(k+1)=F \cdot Z(k)+G \cdot En(k-1) \quad (14)$$

$$NElow(k-1)=H \cdot Z(k)+L \cdot En(k-1) \quad (15)$$

En indicates the error between the actual rotational speed Ne and the target rotational speed ne/fire as described above. Z is an (n×1) matrix indicating the internal variable of the low-pass filter 81. All of F, G, H and L are model parameter matrices, F being an (n×n) matrix, G being an (n×1) matrix, H being a (1×n) matrix and L being a scalar value. When the low-pass filter 81 is designed, the values of the model parameter matrices are pre-determined by specifying the filter characteristics such as a cut-off frequency and the like.

As seen from the equations (14) and (15), the low-pass filter 81 generates the internal variable Z(k+1) of the low-pass filter 81 and the signal NElow which is the filtered rotational speed error En.

It is preferable that the cut-off frequency is set to a frequency below a resonance point of the vibration and sound transfer system between the engine and the interior of the vehicle. Such a cut-off frequency allows resonance to be suppressed in the vibration sound transfer system between the engine and the interior of the vehicle.

Figure 11:
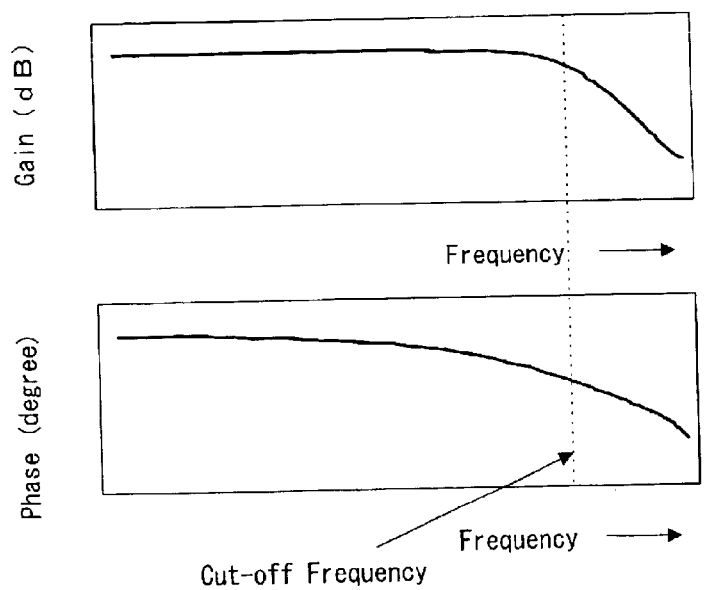
FIG. 11 illustrates frequency characteristics of a low-pass filter in accordance with one embodiment of the invention.

FIG. 11 shows an example of frequency characteristics of the low-pass filter 81 in accordance with one embodiment of the invention. The low-pass filter 81 is implemented with a Butterworth filter in which a cutoff frequency is established considering modeling errors. It is seen that the gain and the phase attenuate in a higher frequency region than the cutoff frequency. When the rotational speed error En is filtered by such a low-pass filter, higher frequency components of the rotational speed error En are removed. Accordingly, the output signal NElow from the low-pass filter 81 does not contain undesired higher frequency components. Performing the frequency-shaping sliding-mode control based on the signal NElow allows the engine rotational speed to converge without causing undesired high frequency vibrations.

In the embodiment, as indicated in the equations (14) and (15), the IIR low-pass filter is designed using state space representation. However, a FIR low-pass filter may be used.

In order to perform the frequency-shaping sliding-mode control, the sliding mode controller 82 establishes a switching function $\sigma_2$ as shown in the equation (16).

$$\sigma_2(k)=\text{pole}/ig \cdot NElow(k-1)+En(k) \quad (16)$$

NElow indicates a signal obtained by removing higher frequency components from the rotational speed error En, as described above. En indicates the error between the actual rotational speed and target rotational speed. pole/ig indicates a setting parameter for the switching function $\sigma_2$. pole/ig is selected to satisfy "$-1<$pole/ig$<1$".

The equation in the case of $\sigma_2(k)=0$ is called an equivalent input system, which specifies convergence characteristics of the rotational speed error En (that is, a quantity to be controlled). Assuming $\sigma_2(k)=0$, the equation (16) is transformed to the equation (17).

$$En(k)=-\text{pole}/ig \cdot NElow(k-1) \tag{17}$$

The equation (17) is expressed on a similar phase space to FIG. 5. The equation (17) is expressed as a switching line on the phase space with NElow(k−1) on the horizontal axis and En(k) on the vertical axis. The frequency-shaping sliding-mode control operates to place a state quantity (NElow(k−1), En(k)) that is a combination of NElow(k−1) and En(k) on the switching line and then restrain it on the switching line. By holding the state quantity on the switching line, the state quantity highly stably converges to the origin 0 on the phase space without being affected by disturbances or the like. In other words, by restraining the state quantity (NElow(k−1), En(k)) on the stable system having no input shown by the equation (17), the engine rotational speed Ne can converge to the target rotational speed ne/fire robustly against disturbances and modeling errors.

The switching function setting parameter pole/ig can be variably selected. The rate of reduction of the rotational speed error En can be designated by adjusting the setting parameter pole/ig. The response-designating characteristics shown in FIG. 6 is applicable to the setting parameter pole/ig.

Figure 12:
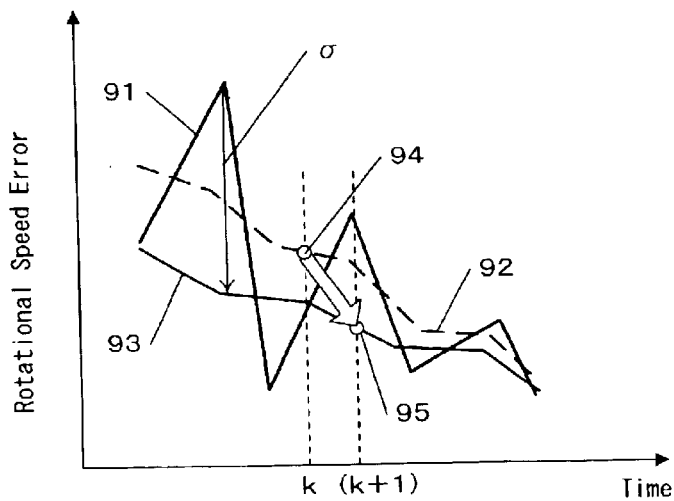
FIG. 12 schematically illustrates convergence behavior of rotational speed by rotational speed control in accordance with one embodiment of the invention.

FIG. 12 illustrates a general concept of the equation (17). A line 91 indicates transition of the rotational speed error En. A curve 92 indicates transition of the signal NElow obtained by removing higher frequency components from En. A curve 93 indicates transition of a value obtained by multiplying the signal NElow by the setting parameter pole/ig.

The rotational speed error En may vary in zigzag as shown by the line 91 due to influence of disturbances such as higher frequencies. However, by establishing the switching function $\sigma_2$ according to the equation (16) and controlling the system to achieve $\sigma_2=0$, the rotational speed error En can converge without being influenced by such disturbances. In other words, as indicated by the equation (17), controlling the system to achieve $\sigma_2=0$ means that the rotational speed error En(k) in the current cycle is controlled to become a value obtained by multiplying the filtered rotational speed error NELow(k−1) in the previous cycle by the setting parameter pole/ig (It should be noted that the absolute value of pole/ig is less than 1, as described above). More specifically, as shown by an arrow, the rotational speed control according to the invention controls the system so that the rotational speed error En for the next cycle is placed on a point 95. The point 95 corresponds to a value obtained by multiplying the filtered rotational speed error NELow (indicated by a reference number 94) in the current cycle by the setting parameter pole/ig. Thus, based on the signal NElow(k−1) containing no disturbance, the rotational speed error En(k) converges to zero at a rate specified by the setting parameter pole/ig.

In a conventional sliding mode control, stability against high frequency vibrations may be worsened if the magnitude of the setting parameter pole/ig is reduced in order to improve the reduction characteristics of the rotational speed error En. However, according to the invention, higher frequency components of the rotational speed error En are removed by the low-pass filter, and the switching function $\sigma_2$ is established based on the filtered error NElow. Accordingly, undesired higher frequency components are not included in the switching function $\sigma_2$. Undesired vibrations in the rotational speed error En are suppressed without sacrificing the reduction characteristics of the rotational speed error En.

Figure 13:
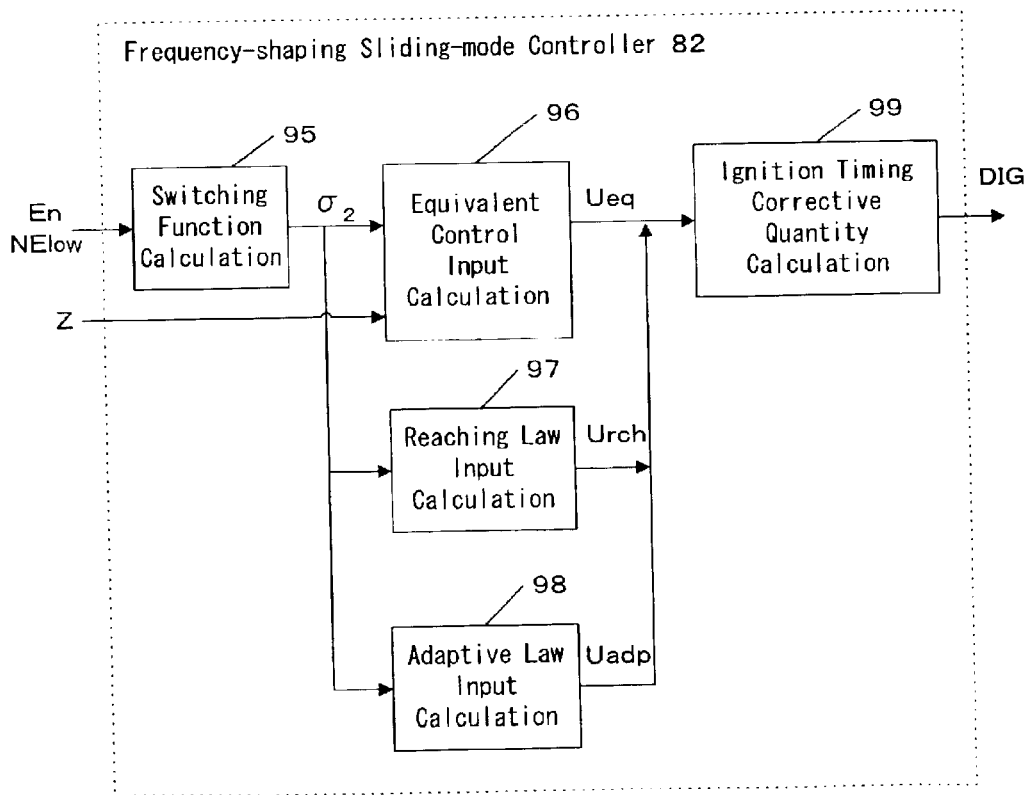
FIG. 13 shows a functional block diagram of a frequency-shaping sliding-mode controller for rotational speed control in accordance with one embodiment of the invention.

FIG. 13 shows a detailed functional block diagram of the frequency-shaping sliding-mode controller 82. These functional blocks are typically implemented with computer programs.

The sliding-mode controller 82 comprises a switching function calculation part 95 for calculating the switching function $\sigma_2$ based on the rotational speed error En and the filtered rotational speed error NElow as described above. The control input is determined by three control input calculation parts 96–98 in such a manner that the value of the switching function $\sigma_2$ calculated by the switching-function calculation part 95 becomes zero. An equivalent control input calculation part 96 calculates an equivalent control input Ueq for restraining the state quantity on the switching line. The internal variable Z of the low-pass filter is used for the calculation.

A reaching law input calculation part 97 calculates a reaching law input Urch for placing the state quantity on the switching line. An adaptive law input calculation part 98 calculates an adaptive law input Uadp for placing the state quantity on the switching line while suppressing modeling errors and disturbances. An ignition timing calculation part 99 sums the calculated three inputs Ueq, Urch and Uadp to determine the ignition timing corrective quantity DIG.

Specific calculation performed by the equivalent control input calculation part 96 will be described. The equivalent control input Ueq needs to satisfy the equation (18) because it is an input for restraining the state quantity onto the switching line.

$$\sigma_2(k+1)=\sigma_2(k) \tag{18}$$

A model in which the dead time is zero (d=0) in the equation (13) is established.

$$En(k+1)=a3 \cdot En(k)+a4 \cdot En(k-1)+b2 \cdot DIG(k) \tag{19}$$

The equation (19) has a modeling error because the dead time is set to zero. However, such a modeling error can be compensated by robustness of the sliding mode control having the adaptive law input.

On the other hand, as described above, the state equation and the output equation for the low-pass filter 81 are expressed by the equations (14) and (15). Based on the equations (14), (15), and (18), $\sigma_2$(k) and $\sigma_2$(k+1) are determined as shown by the equations (20) and (21), respectively.

$$\begin{aligned}\sigma_2(k) &= pole/ig \cdot NElow(k-1) + En(k) \\ &= pole/ig \cdot (H \cdot Z(k) + L \cdot En(k-1)) + En(k)\end{aligned} \tag{20}$$

$$\begin{aligned}\sigma_2(k+1) &= pole/ig \cdot NElow(k) + En(k+1) \\ &= pole/ig(H \cdot Z(k+1) + L \cdot En(k)) + a4 \cdot En(k-1) + \\ &\quad a3 \cdot En(k) + b2 \cdot DIG(k)) \\ &= pole/ig[H(F \cdot Z(k) + G \cdot En(k-1)) + L \cdot En(k)] + \\ &\quad a4 \cdot En(k-1) + a3 \cdot En(k) + b2 \cdot DIG(k)\end{aligned} \tag{21}$$

Therefore, the equivalent control input Ueq that satisfies $\sigma_2(k+1)=\sigma_2(k)$ is determined from the equations (20) and (21), as shown by the equation (22).

$$Ueq=-[(pole/ig \cdot H \cdot F - pole/ig \cdot H) \cdot Z(k)+(pole/ig \cdot L-1+a3) \cdot En(k) \\ +(pole/ig \cdot H \cdot G+a4-pole/ig \cdot L) \cdot En(k-1)]/b2 \quad (22)$$

As indicated by the equation (22), the equivalent control input Ueq contains the internal variable Z(k) of the low-pass filter 81 as well as the parameters F, G, H and L indicating the filter characteristics. Thus, a phase lag caused by the filtering is compensated, allowing NElow to be maintained on the switching line.

The reaching law input calculating part 97 calculates the reaching law input Urch having a value that depends on the value of the switching function $\sigma_2$, in accordance with the equation (23). In the embodiment, the reaching law input Urch is calculated to have a value that is proportional to the value of the switching function $\sigma_2$. Krch indicates a feedback gain of the reaching law, which is predetermined through, for example, simulation in which the stability and quick response of the convergence of the value of the switching function $\sigma_2$ to zero are taken into consideration.

$$Urch(k)=Krch \cdot \sigma_2(k)=Krch(pole/ig \cdot NElow(k-1)+En(k)) \quad (23)$$

The adaptive law input calculation part 98 calculates the adaptive law input Uadp having a value that depends on an integrated value of the switching function $\sigma_2$, in accordance with the equation (24). In the embodiment, the adaptive law input Uadp is calculated to have a value that is proportional to the integrated value of the switching function $\sigma_2$. Kadp indicates a feedback gain of the adaptive law, which is predetermined through, for example, simulation in which the stability and quick response of the convergence of the value of the switching function $\sigma_2$ to zero are taken into consideration.

$$Uadp(k)=Uadp(k-1)+Kadp \cdot \sigma_2(k) \quad (24)$$

Conventionally, such adaptive law is not taken into consideration in the sliding mode control. However, in the frequency-shaping sliding-mode control according to the embodiment of the invention, adaptive law is used, thereby compensating a steady-state error of the switching function $\sigma_2$. In other words, even when the reaching law input shown in the equation (23) is used, the state quantity can approach the switching line by using the adaptive law shown in the equation (24). More specifically; according to the conventional sliding mode control, the state quantity approaches the switching line by switching the reaching law input relative to the switching line. However, such control may cause chattering. Therefore, in the invention, the adaptive law input having a value proportional to the integrated value of the switching function is also used as the control input in addition to the reaching law input having a value proportional to the switching function, so as to stably cause the state quantity to approach the switching line. Thus, the state quantity can be stably placed on the switching line without causing any chattering, thereby suppressing disturbances and modeling errors against the switching function.

The ignition timing corrective quantity calculation part 99 determines the ignition timing corrective quantity DIG by summing the equivalent control input Ueq, the reaching law input Urch and the adaptive law input Uadp, as shown in the equation (25).

$$DIG(k)=Ueq(k)+Urch(k)+Uadp(k) \quad (25)$$

Thus, the frequency-shaping sliding-mode control according to the invention extracts lower frequency components of the quantity to be controlled (in this case, the rotational speed error) through the low-pass filter. The extracted lower frequency components are used to define the switching function. According to the frequency-shaping sliding-mode control, capability of the controlled quantity to follow the target value (or, tracking characteristics) can be specified by the setting parameter of the switching function. Furthermore, the convergence characteristics of the switching function can be defined by the feedback gains of the reaching law and the adaptive law. Frequency components to be suppressed can also be defined by the low-pass filter. Since these characteristics can be individually designed, the frequency-shaping sliding-mode control of the invention can be easily implemented.

Figure 14:
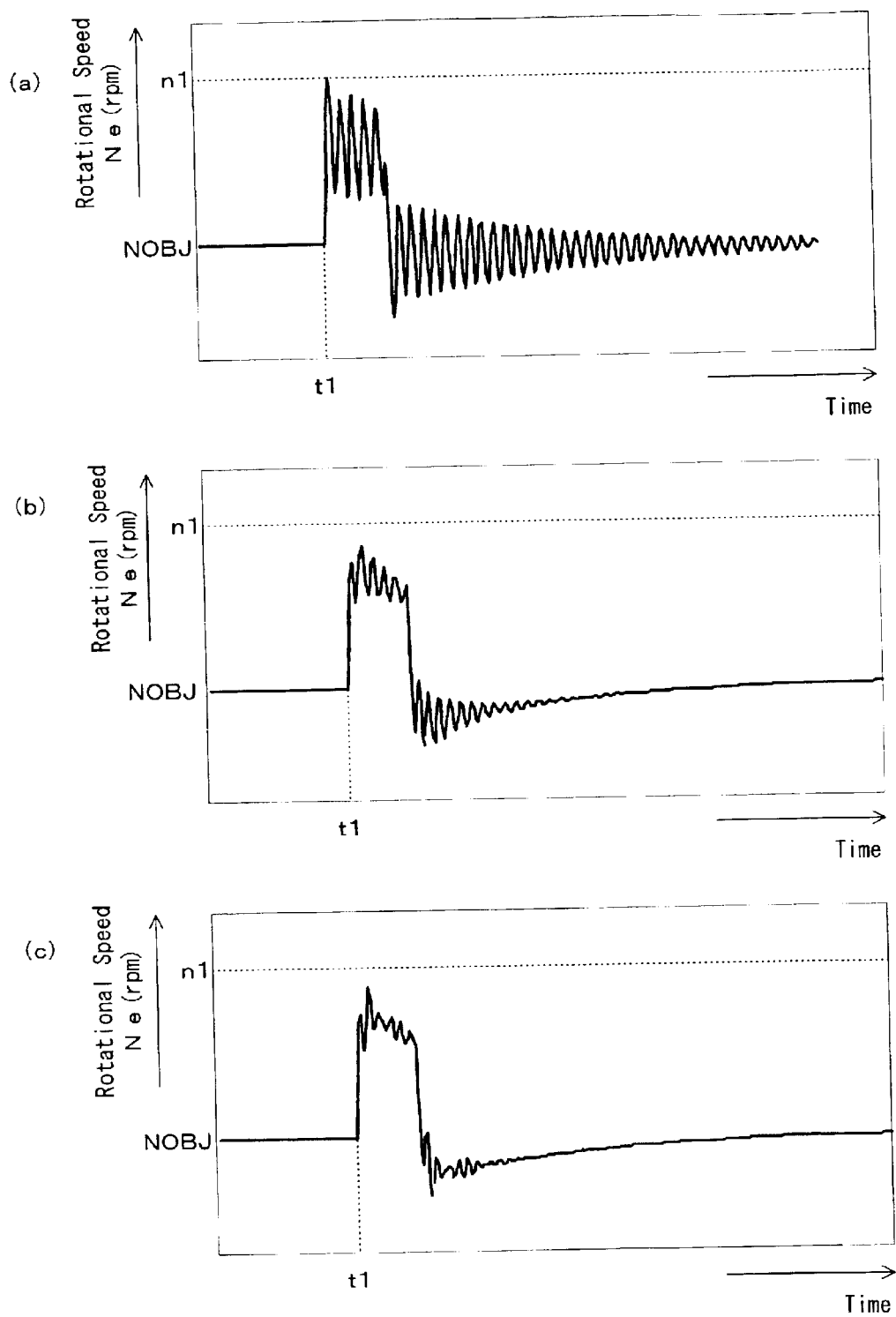
FIG. 14 illustrates variations in rotational speed in (a) conventional PI control, (b) conventional sliding mode control, and (c) a frequency-shaping sliding-mode control according to one embodiment of the invention.

FIG. 14 shows an example of variations in the engine rotational speed in a state in which disturbances are added when t1 seconds have elapsed since the start of the rotational speed control. FIG. 14(a) shows a case in which the rotational speed control is performed in accordance with conventional PI control. FIG. 14(b) shows a case in which the rotational speed control is performed in accordance with conventional sliding mode control without a low-pass filter. FIG. 14(c) shows a case in which the rotational speed control is performed in accordance with the frequency-shaping sliding-mode control according to one embodiment of the invention.

According to the PI control, the maximum rotational speed error reaches n1 when the disturbances are added. After the addition of disturbances, unstable vibrations in the rotational speed continues.

According to the conventional sliding mode control, the rotational speed error at the addition of disturbances decreases compared to the PI control case. The stability of vibrations is improved compared to the PI control case.

According to the frequency-shaping sliding-mode control of the invention, the error at the addition of disturbances does not increase compared to the conventional sliding mode control case. The stability of vibrations is further improved. Thus, according to the frequency-shaping sliding-mode control, the stability of vibrations can be improved without increasing the rotational speed error because higher frequency components are removed. As a result, resonance which may occur in the vibration and sound transfer system between the engine and the interior of the vehicle is suppressed. Especially, in an idling state immediately after the start of the engine, it is possible to prevent vibrations caused by the rotational speed control from occurring in the interior of the vehicle.

Second Embodiment of Rotational Speed Control

Figure 15:
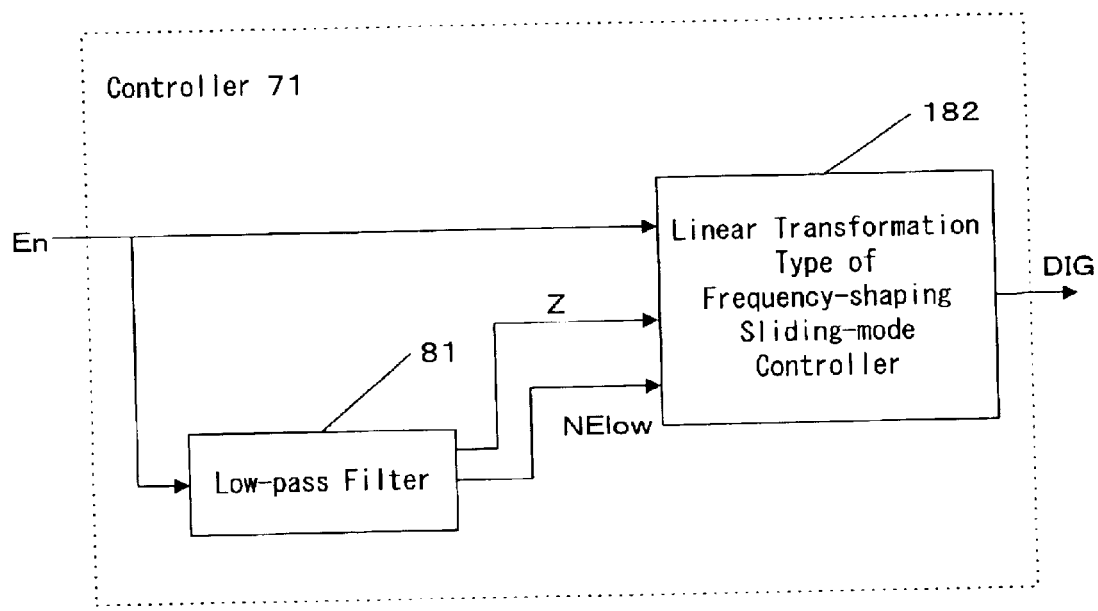
FIG. 15 shows a block diagram of a controller for rotational speed control in accordance with another embodiment of the invention.

FIG. 15 shows a detailed block diagram of the controller 71 (FIG. 8) in accordance with a second embodiment of the invention. As seen compared to FIG. 10, the second embodiment is different from the first embodiment in that a linear transformation type of frequency-shaping sliding-mode controller 182 (hereinafter referred to as a linear sliding mode controller) is provided. The linear sliding mode controller 182 uses linear independent state variables as the control input to perform response-designating control. Such response-designating control is called linear transformation type of frequency-shaping response-designating control. In the embodiment, the control is implemented with a linear transformation type of frequency-shaping sliding-mode control.

A low-pass filter 81 may be the same as that of FIG. 10. A state equation and an output equation for the low-pass filter 81 can be expressed by the above equations (14) and (15), respectively. The linear sliding mode controller 182 establishes the switching function $\sigma_2$ as shown in the above equation (16). The switching line is expressed as shown in the above equation (17).

The linear transformation type of frequency-shaping sliding-mode control operates to cause the state quantity (NElow(k−1), En(k)), which is a combination of NElow(k−1) and En(k), to gradually approach the switching line while causing the state quantity to converge to the origin 0 on the phase space. In other words, the switching function $\sigma_2$ gradually approaches zero. At the same time, the error En converges to zero. Thus, the state quantity (NElow(k−1), En(k)) is eventually restrained in the stable system having no input shown by the equation (17) and the engine rotational speed Ne converges to the target rotational speed ne/fire. Details of behavior of the linear transformation type of frequency-shaping sliding-mode control will be described later.

The linear sliding mode controller 182 determines a control input DIG in accordance with the equation (26). K1 through K3 are state feedback coefficients, K1 being a (1×n) matrix, and K2 and K3 being scalar values.

$$DIG(k) = K1 \cdot Z(k) + K2 \cdot En(k-1) + K3 \cdot \sigma_2(k) \tag{26}$$

As shown in the equation (26), the control input DIG has a corrective term K1 for stabilizing the internal variable Z of the filter, a corrective term K2 for stabilizing the rotational speed error En, and a corrective term K3 that varies depending on the switching function $\sigma_2$. These corrective terms are pre-identified with optimal regulator control.

A method of identifying these corrective terms K1, K2 and K3 will be described. When the dead time is set to zero (d=0), the model equation (13) is expressed using state space representation as shown by the equation (27).

$$\begin{pmatrix} En(k) \\ En(k+1) \end{pmatrix} = \begin{pmatrix} 0 & 1 \\ a4 & a3 \end{pmatrix} \begin{pmatrix} En(k-1) \\ En(k) \end{pmatrix} + \begin{pmatrix} 0 \\ b2 \end{pmatrix} DIG(k) \tag{27}$$

Since the dead time is zero, the above equation (27) has a modeling error. However, such a modeling error can be compensated by the robustness of the sliding mode control.

On the other hand, the switching function $\sigma_2$ is expressed using the equation (15) for the low-pass filter 81, as shown by the equation (28).

$$\begin{aligned} \sigma_2(k) &= pole/ig \cdot NElow(k-1) + En(k) \\ &= pole/ig \cdot (H \cdot Z(k) + L \cdot En(k-1)) + En(k) \\ &= (pole/ig \cdot H \quad pole/ig \cdot L \quad 1) \begin{pmatrix} Z(k) \\ En(k-1) \\ En(k) \end{pmatrix} \end{aligned} \tag{28}$$

In order to simultaneously perform the convergence of the switching function $\sigma_2$ and the convergence of the error En in view of the stability of the entire control system, a system equation of the control system is determined as follows. The state equation of the object of the control, which is shown by the equation (27), and the state equation of the filter, which is shown by the equation (14), are combined to derive the equation (29).

$$\begin{pmatrix} Z(k+1) \\ En(k) \\ En(k+1) \end{pmatrix} = \begin{pmatrix} F & G & O(n\times 1) \\ O(1\times n) & 0 & 1 \\ O(1\times n) & a4 & a3 \end{pmatrix} \begin{pmatrix} Z(k) \\ En(k-1) \\ En(k) \end{pmatrix} + \begin{pmatrix} O(n\times 1) \\ 0 \\ b2 \end{pmatrix} DIG(k) \tag{29}$$

In order to include the switching function $\sigma_2$ in the state variables, a linear transformation equation of the state variables shown in the equation (30) is derived based on the equation (28). In the equation (30), "I" indicates an unit matrix.

$$\begin{pmatrix} Z(k) \\ En(k-1) \\ \sigma_2(k) \end{pmatrix} = T \begin{pmatrix} Z(k) \\ En(k-1) \\ En(k) \end{pmatrix} \tag{30}$$

$$\text{where } T = \begin{pmatrix} I(n\times n) & O(n\times 1) & O(n\times 1) \\ O(1\times n) & 1 & 0 \\ pole/ig \cdot H & pole/ig \cdot L & 1 \end{pmatrix}$$

By applying the equation (30) to the equation (29), the equation (31) is derived. The equation (31) shows a state equation of the object including the filter, in which the object is linearly transformed by T. The internal variable Z of the filter, the rotational speed error En and the switching function $\sigma_2$ are included in the state equation as linear independent state variables.

$$\begin{pmatrix} Z(k+1) \\ En(k) \\ \sigma_2(k+1) \end{pmatrix} = T \begin{pmatrix} F & G & O(n\times 1) \\ O(1\times n) & 0 & 1 \\ O(1\times n) & a4 & a3 \end{pmatrix} T^{-1} \begin{pmatrix} Z(k) \\ En(k-1) \\ \sigma_2(k) \end{pmatrix} + T \begin{pmatrix} O(n\times 1) \\ 0 \\ b2 \end{pmatrix} DIG(k) \tag{31}$$

The degree of convergence of each of the state variables Z, En and $\sigma_2$ can be separately adjusted by performing state feedback control on a system shown by the state equation (31). Thus, individual state variables can stably converge without making the system unstable.

The control input DIG is determined based on the equation (31), as shown in the above equation (26). The state feedback gains (corrective terms) K1, K2 and K3 of the control input DIG are determined so that the system shown by the equation (31) is stabilized.

In one embodiment, the state feedback gains K1, K2 and K3 are determined by utilizing optimal regulator control. In the optimal regulator control, an evaluation function J can be expressed as shown in the equation (32). The control input for minimizing the evaluation function J can be determined using the solution P of the Riccati equation, as shown by the equation (33). Thus, the state feedback gains K1, K2 and K3 are determined in accordance with the equation (34).

$$J = \sum_{K=0}^{N} \left[ X_{sys}^T(k) \cdot Q \cdot X_{sys} + r \cdot DIG^2(k) \right] \tag{32}$$

-continued where $X_{sys} = \begin{pmatrix} Z(k) \\ En(k-1) \\ \sigma_2(k) \end{pmatrix}$ Q: $(n+2 \times n+2)$ weighting matrix r: $(1 \times 1)$ weighting coefficient $$P = A_{sys}^T [P - P \cdot B_{sys}(r + B_{sys}^T \cdot P \cdot B_{sys})^{-1} B_{sys}^T \cdot P] A_{sys} + Q$$

where $$A_{sys} = T \begin{pmatrix} F & G & O(n \times 1) \\ O(1 \times n) & 0 & 1 \\ O(1 \times n) & a4 & a3 \end{pmatrix} T^{-1} \quad (33)$$

$$B_{sys} = \begin{pmatrix} O(n \times 1) \\ 0 \\ b2 \end{pmatrix}$$

$$(K1\ K2\ K3) = -[(r + B_{sys}^T \cdot P \cdot B_{sys})^{-1} B_{sys}^T \cdot P \cdot A_{sys}] \quad (34)$$

In another embodiment of the invention, the control input DIG may further include an integrated value of the switching function $\sigma_2$ as a state variable as shown in the equation (35).

$$DIG(k) = K1 \cdot Z(k) + K2 \cdot En(k-1) + K3 \cdot \sigma_2(k) + K4 \cdot \sum_{i=1}^{K} \sigma_2(i) \quad (35)$$

The state feedback gains K1 through K4 are determined as follows. A linearly-transformed state equation for the object including the filter can be expressed by the equation (36).

$$\begin{pmatrix} X_{sys}(k+1) \\ \sum_{i=1}^{K+1} \sigma_2(i) \end{pmatrix} = \begin{pmatrix} A_{sys} & O(n+2 \times 1) \\ O(1 \times n+1) & 1 & 1 \end{pmatrix} \begin{pmatrix} X_{sys}(k+1) \\ \sum_{i=1}^{K} \sigma_2(i) \end{pmatrix} + \begin{pmatrix} B_{sys} \\ 0 \end{pmatrix} DIG(k) \quad (36)$$

The evaluation function, Riccati equation and state feedback gains K1 through K4 are expressed by the equations (37) through (39), respectively.

$$J_{aug} = \sum_{K=0}^{N} [X_{aug}^T(k) \cdot Q_{aug} \cdot X_{aug} + r_{aug} \cdot DIG^2(k)] \quad (37)$$

where $X_{aug} = \begin{pmatrix} X_{sys}(k+1) \\ \sum_{i=1}^{K} \sigma_2(i) \end{pmatrix}$ $Q_{aug}$: $(n+3 \times n+3)$ weighting matrix $r_{aug}$: $(1 \times 1)$ weighting coefficient $$P_{aug} = A_{aug}^T [P_{aug} - P_{aug} \cdot B_{aug}(r_{aug} + B_{aug}^T \cdot P_{aug} \cdot B_{aug})^{-1} B_{aug}^T \cdot P_{aug}] A_{aug} + Q_{aug}$$

where $$A_{aug} = \begin{pmatrix} A_{sys} & O(n+2 \times 1) \\ O(1 \times n+1) & 1 & 1 \end{pmatrix} \quad (38)$$

$$B_{aug} = \begin{pmatrix} B_{sys} \\ 0 \end{pmatrix}$$

$$(K1\ K2\ K3\ K4) = -[(r_{aug} + B_{aug}^T \cdot P_{aug} \cdot B_{aug})^{-1} B_{aug}^T \cdot P_{aug} \cdot A_{aug}] \quad (39)$$

Thus, according to the linear-transformation type of frequency-shaping sliding-mode control in accordance with the invention, the internal variable of the filter, the quantity to be controlled, the switching function and/or the integrated value of the switching function, which are all linear and independent each other, are included in the control input. Therefore, the state feedback gains of the internal variable of the low-pass filter, the quantity to be controlled and the value of the switching function and/or the integrated value of the switching function can be individually adjusted. Thus, each of the state variables can stably converge without making the control system unstable.

Figure 16:
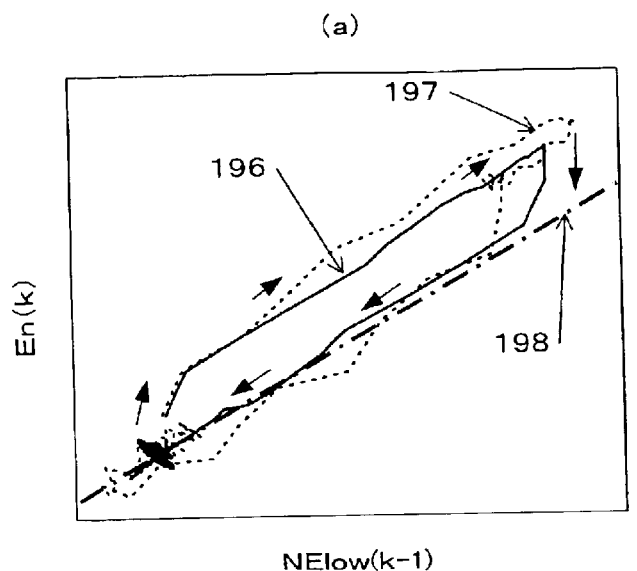
FIG. 16 illustrates convergence behavior of a controlled quantity by linear-transformation type of frequency-shaping sliding-mode control in accordance with one embodiment of the invention.
Figure 16:
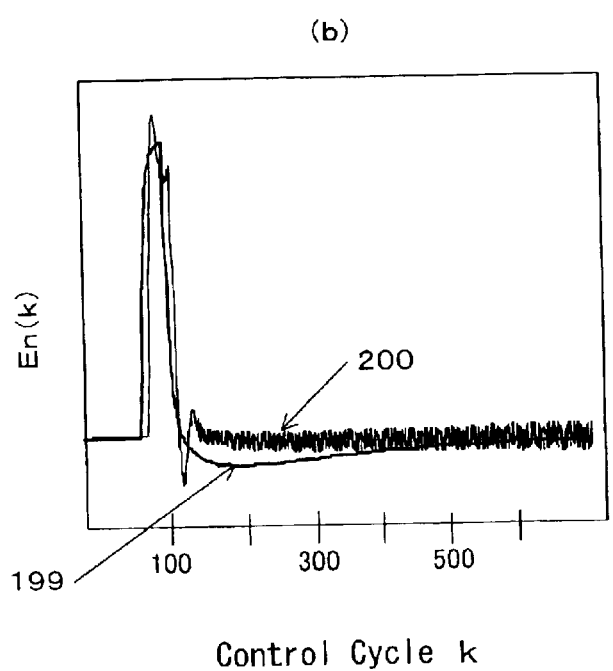

Referring to FIG. 16(a), a straight line 198 shows the switching line as described above. A curve 196 shows behavior of the state quantity on the phase space in the linear-transformation type of frequency-shaping sliding-mode control in accordance with the second embodiment. A curve 197 shows behavior of the state quantity on the phase space in the frequency-shaping sliding-mode control in accordance with the first embodiment.

As described above, the linear-transformation type of frequency-shaping sliding-mode control in accordance with the second embodiment is different from the frequency-shaping sliding-mode control in accordance with the first embodiment in that the state feedback gains are individually adjusted to stabilize the control system. The frequency-shaping sliding-mode control holds the switching function value at zero and then causes the rotational speed error En to converge. The linear-transformation type of frequency-shaping sliding-mode control causes the switching function value to gradually approach zero while causing the rotational speed error En to converge.

The curve 197 shows a state in which the value of the switching function $\sigma_2$ cannot be held at zero due to a modeling error (namely, the values of the state quantity (NElow(k−1), En(k)) can not be held on the switching line 198). On the other hand, the curve 196 shows a state in which the switching function value approaches zero while the rotational speed error En converges to zero despite modeling errors.

Referring to FIG. 16(b), a curve 199 shows an example of response of the rotational speed error En in the linear-transformation type of frequency-shaping sliding-mode control in accordance with the second embodiment. A curve 200 shows an example of response of the rotational speed error En in the frequency-shaping sliding-mode control in accordance with the first embodiment. As shown by the curve 200, in the frequency-shaping sliding-mode control, the rotational speed error En can not converge in the presence of modeling errors. This is because the value of the switching function $\sigma_2$ cannot be held at zero in the frequency-shaping sliding-mode control as shown by the curve 197 of FIG. 16(a). In contrast, as shown by the curve 199, in the linear-transformation type of frequency-shaping sliding-mode control, the rotational speed error En can converge. This is because, as shown by the curve 196 of FIG. 16(a), the linear-transformation type of frequency-shaping sliding-mode control operates so that the rotational speed error En and the value of the switching function $\sigma_2$ concurrently converge even if the value of the switching function $\sigma_2$ cannot be held at zero.

Thus, according to the linear-transformation type of frequency-shaping sliding-mode control, the controlled quantity and the switching function value (and/or the integrated value of the switching function) can concurrently converge even when the switching function $\sigma_2$ cannot be held at zero. Instability of the system which may be caused when the switching function can not be held at zero is avoided.

Figure 17:
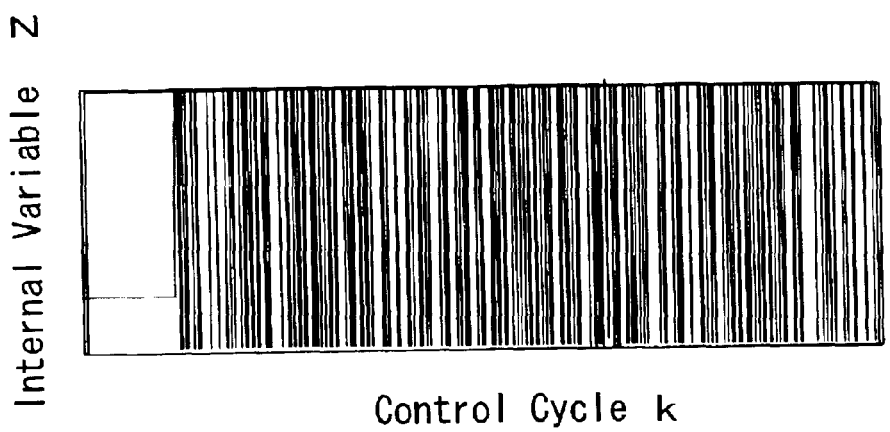
FIG. 17 illustrates convergence behavior of an internal variable of a filter in linear-transformation type of frequency-shaping sliding-mode control in accordance with one embodiment of the invention.
Figure 17:
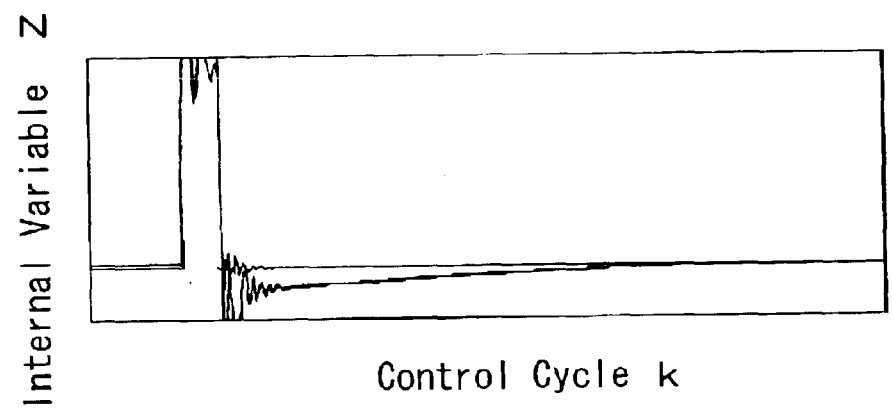

FIG. 17(a) shows behavior of the internal variable of the filter in the frequency-shaping sliding-mode control according to the first embodiment. FIG. 17(b) shows behavior of the internal variable of the filter in the linear-transformation type of frequency-shaping sliding-mode control according to the second embodiment. Both show a case in which the switching function cannot be held at zero due to modeling errors. In the frequency-shaping sliding-mode control, the internal variable of the filter oscillates because the switching function cannot be held at zero. In the linear-transformation type of frequency-shaping sliding-mode control, the internal variable of the filter stably converges even when the switching function cannot be held at zero.

Main Flow of Control System

Figure 18:
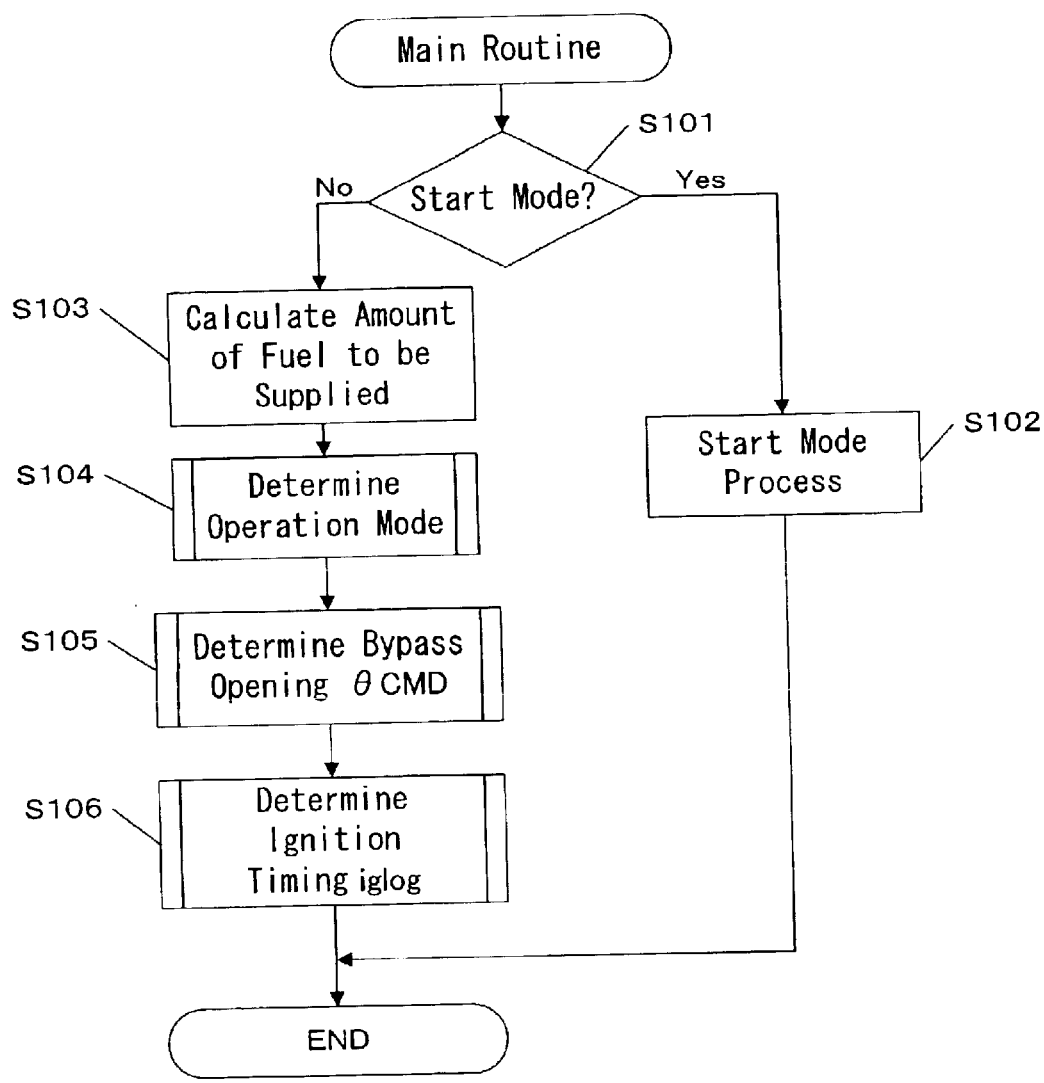
FIG. 18 shows a main routine of a control system in accordance with one embodiment of the invention.

FIG. 18 shows a flowchart for specifically implementing the functional blocks of the control system shown in FIG. 3 in accordance with one embodiment of the invention. FIG. 18 is a main routine carried out when the engine is started. The main routine is processed in predetermined control cycles such as TDC cycles.

In step S101, it is determined whether the operation mode is a start mode. If the complete combustion of the engine 1 is not confirmed, the operation mode is determined to be the start mode. The confirmation of the complete combustion may be performed based on the engine rotational speed Ne.

If the operation mode is the start mode, the process proceeds to step S102, in which the start mode processing is performed. Specifically, a fuel supply amount, bypass opening and ignition timing are determined based on tables and expressions stored in the storage device 5c (FIG. 1). The fuel injection valve 6, the bypass valve 22 and the spark plug 26 (FIG. 1) are driven in accordance with the determined fuel supply amount, bypass opening and ignition timing so that the engine is cranked.

The start mode processing further initializes flags and variables to zero, which are to be used in the FIRE mode. The FIRE mode elapsed time t/fire (see FIG. 2) is also initialized to zero. The start mode processing stores the engine water temperature Tw, the intake air temperature Ta and the atmospheric pressure Pa detected by various sensors shown in FIG. 1.

In step 101, if it is determined that the operation mode is not the start mode, the process proceeds to step S103, in which a fuel supply amount is determined. Specifically, the process refers to a pre-stored table based on the engine rotational speed Ne and the intake manifold pressure Pb detected by the Ne sensor 13 and the Pb sensor 8 of FIG. 1, to determine a basic fuel supply amount. The basic fuel supply amount is corrected in accordance with values such as intake air temperature Ta and engine water temperature Tw detected by the Ta sensor 9 and the Tw sensor 10, to determine the amount of fuel to be supplied. The fuel injection valve 6 is driven so that the determined fuel supply amount is supplied.

The process proceeds to step S104, in which an operation mode determination routine (FIG. 19) is performed. In the routine, it is determined which mode, either the FIRE mode or the normal mode, is to be performed.

The process proceeds to step S105, in which a routine (FIG. 20) for calculating the bypass opening θCMD in the FIRE mode is performed. The routine performs the sliding mode control as described above to determine the corrective quantity i/sld for the bypass opening so that the predicted integrated intake air amount qair/pre converges to the target integrated intake air amount qair/cmd. The bypass opening θCMD thus corrected with the corrective quantity i/sld is determined.

In step S106, a routine (FIG. 22) for determining the ignition timing iglog is performed. The routine performs either the frequency-shaping sliding-mode or the linear-transformation type of frequency-shaping sliding-mode for determining the corrective quantity DIG so that the actual rotational speed Ne converges to the target rotational speed ne/fire, as described above. The ignition timing iglog thus corrected with the corrective quantity DIG is determined.

Operation Mode Determination

Figure 19:
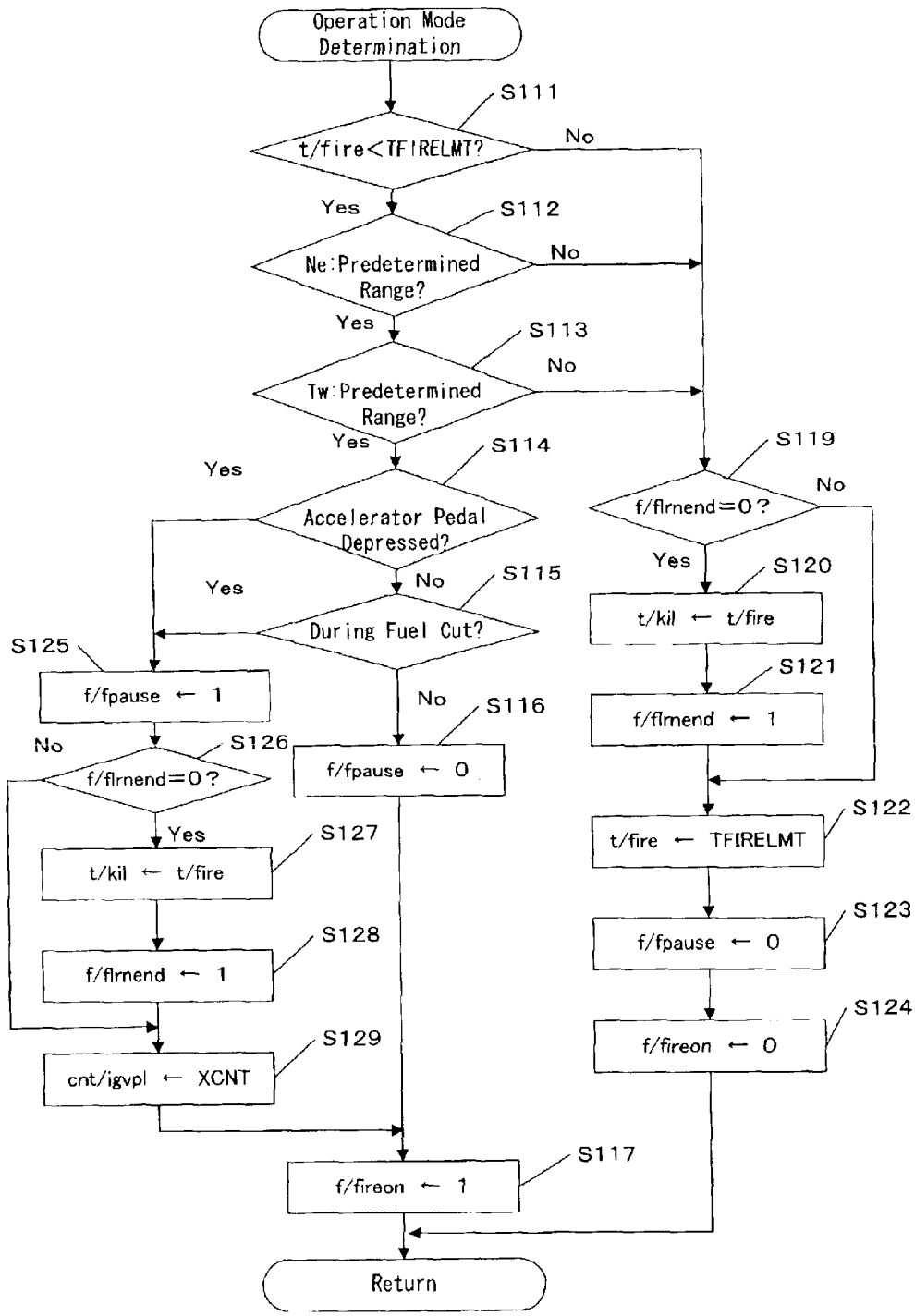
FIG. 19 shows a flowchart of a process for determining an operation mode in accordance with one embodiment of the invention.

FIG. 19 is a flowchart showing details of the operation mode determination routine performed in step S104 of FIG. 18. In step S111, if it is determined that the elapsed time t/fire since the start of the FIRE mode (that is, since the confirmation of the complete combustion) exceeds a predetermined time limit TFIRELMT, the process proceeds to step S119 so as to exit the FIRE mode. In step S112, if it is determined that the engine rotational speed Ne is not within a predetermined range, or in step S113, if it is determined that the engine water temperature Tw is not within a predetermined range, the process proceeds to step S119 so as to exit the FIRE mode.

If all the determinations in steps S111 through S113 are YES, it is determined whether the accelerator pedal of the vehicle is depressed (S114). This may be detected by the throttle valve opening sensor 4 (FIG. 1). If the accelerator pedal is depressed, the process proceeds to step S125 so as to temporarily interrupt the FIRE mode. In step S115, it is determined whether fuel cut is being performed. This may be detected by examining a flag that is set during the fuel cut. The fuel cut is a process for temporarily stopping supplying the fuel. During the fuel cut, the process proceeds to step S125 so as to temporarily interrupt the FIRE mode. Proceeding to step S125 indicates a state in which the air-fuel mixture continues to be combusted to perform operation other than an idling operation of the engine 1. Such a state may include, for example, starting the vehicle and racing the engine 1.

If either of the determinations in steps S114 and S115 is NO, it indicates a state in which the engine 1 should be in the idling operation. In this case, a FIRE interruption flag f/fpause is set to zero to indicate that the FIRE mode is not interrupted (S116). The FIRE mode permission flag f/fireon is set to 1 to perform the FIRE mode (S117).

Steps S119 through S124 are processes for shifting to the normal mode. In step S119, a value of a flag f/flrnend is examined. This flag is to be set to 1 when a learning calculation process ends, which will be described later. If the value of the flag is zero, it indicates that the learning calculation process is not completed. The current FIRE elapsed time t/fire is set in a variable t/kil that indicates the ending time of the learning calculation (S120). The flag f/flrnend is set to "1" so as to end the learning calculation process (S121).

In step S122, the FIRE elapsed time t/fire is forcibly set to the time limit TFIRELMT. This causes the determination of step S111 in a subsequent cycle to be "NO", thereby implementing the normal mode, not the FIRE mode. The FIRE interruption flag f/fpause is set to zero (S123) and the FIRE permission flag f/fireon is set to zero (S124). Thus, the normal mode is selected as the current operation mode.

Steps S125 through S129 are processes for interrupting the FIRE mode. In step S125, the FIRE interruption flag f/fpause is set to 1. In steps S126 through S128, the same processes as steps S119 through S121 are performed to end the learning calculation process. In step S129, a count-down timer cnt/igvpl to be used in a process of controlling the ignition timing (described later) is set to an initial value XCNT. The process proceeds to step S117, in which the FIRE permission flag f/fireon is set to 1 to prevent the FIRE mode from being terminated.

Bypass Opening Calculation Routine

Figure 20:
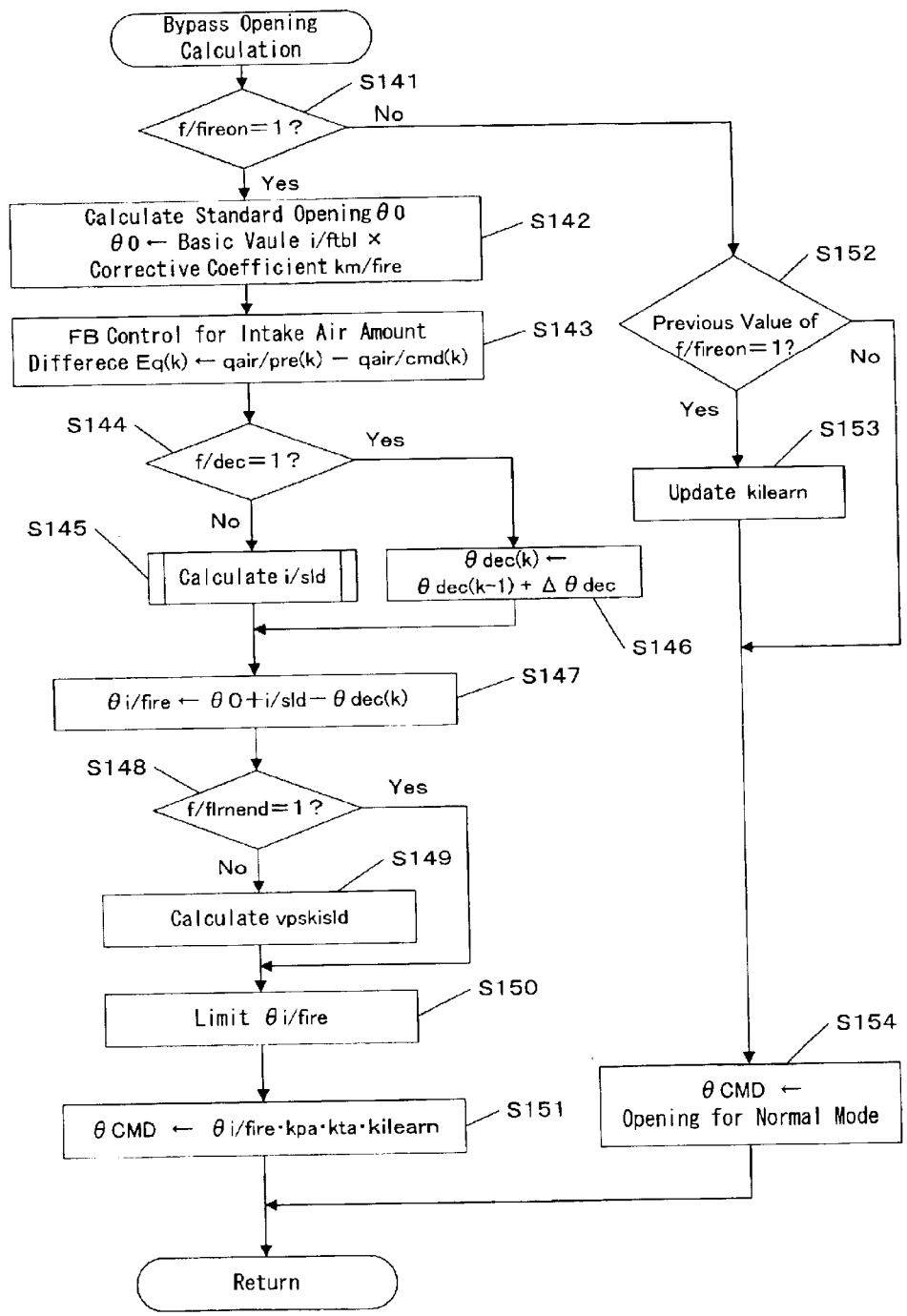
FIG. 20 shows a flowchart of a process for calculating a bypass opening θCMD in accordance with one embodiment of the invention.

FIG. 20 is a flowchart of a routine for calculating the bypass opening θCMD performed in step S105 of FIG. 18. In step S141, it is determined whether the value of the FIRE permission flag f/fireon is 1. If the value is 1, the process proceeds to step S142 so as to determine the bypass opening for the FIRE mode. If the value is zero, the process proceeds to step S152 so as to determine the bypass opening for the normal mode.

In step 142, the standard opening θ0 is calculated. Specifically, a basic value i/ftbl for the standard opening θ0 is determined by referring to a table stored in the storage device 5c (FIG. 1) based on the detected engine water temperature Tw. The standard opening θ0 is a bypass opening for defining the intake air amount to be introduced to properly activate the catalytic converter in the FIRE mode, and its basic value i/ftbl indicates the maximum value of the standard opening θ0. According to the table, the basic value i/ftbl is smaller as the engine water temperature Tw is higher. Since the temperature Tw at the start of the engine is considered to be equivalent to the initial temperature of the catalytic converter, heat energy required to activate the catalytic converter is less as the engine temperature gets higher.

The automatic transmission may be provided in the engine. It is preferable that the basic value i/ftbl when the shifted position is in the drive range is greater than the basic value i/ftbl when the shifted position is in the neutral range. This is because the engine load in the drive range is greater than in the neutral range. In another embodiment in which the temperature of the catalyst is directly detected, the basic value i/ftbl may be calculated by searching the above table based on the detected catalyst temperature.

A corrective coefficient km/fire ($\leq 1$) for correcting the basic value i/ftbl is calculated by referring to a pre-stored table based on the FIRE elapsed time t/fire. According to the table, the corrective coefficient km/fire increases until the FIRE elapsed time t/fire reaches a predetermined value. km/fire is kept constant (for example, 1) for a predetermined period after the FIRE elapsed time t/fire has reached the predetermined value. km/fire decreases after the predetermined period. Thus, the standard opening θ0 is controlled to gradually decrease after the FIRE mode has proceeded to a certain extent, thereby preventing the rotational speed Ne from increasing due to the reduced friction. The standard opening θ0 is calculated by multiplying the basic value i/ftbl by the corrective coefficient km/fire.

In steps S143 through S145, the above intake air amount control is performed. In step S143, the predicted integrated intake air amount qair/pre and the target integrated intake air amount qair/cmd are determined according to the above equations (1) through (4), and then the error Eq between the two integrated amounts is calculated.

As described referring to FIG. 7, it is preferable that the predicted and target integrated intake air amounts qair/pre and qair/cmd are forcibly set to zero until the FIRE elapsed time t/fire reaches the predetermined time TISLDLMT (this process is not shown in FIG. 20 for the sake of simplicity).

In step S144, the value of an ignition timing flag f/dec is examined. The flag f/dec is to be set to 1 when the ignition timing iglog is more retarded than a threshold value IGX in a process for generating the ignition timing iglog, which will be described later. The flag f/dec is to be set to zero when the ignition timing is more advanced. The flag f/dec is initialized to zero in the start mode processing (step S102 of FIG. 18).

When the value of the flag f/dec is zero, a routine (FIG. 21) for calculating the corrective quantity i/sld is performed (S145). In this routine, the sliding mode control is performed to determine the corrective quantity i/sld for the bypass opening so that the intake air amount error Eq converges to zero.

When the value of the flag f/dec is 1, the process proceeds to step S146, in which an opening corrective quantity θdec is incremented by Δθdec. The opening corrective quantity θdec is a quantity for correcting the standard opening θ0 (see step S147). Since the current ignition timing is more retarded than the threshold value IGX, the opening corrective quantity θdec is increased to make the ignition timing more advanced. Thus, the ignition timing is prevented from being becoming excessively retarded. Δθdec may be obtained by referring to a pre-stored table based on the engine water temperature Tw. According to the table, Δθdec when the engine water temperature Tw is in a higher temperature range is greater than Δθdec when the engine water temperature Tw is in a middle or lower temperature range. This is because the friction reduction tends to more easily occur when the engine water temperature Tw is higher than when the engine water temperature Tw is middle or lower.

The process proceeds to step S147, in which a preliminary value θi/fire for the bypass opening is calculated according to the equation (40). When the step S146 was performed, the value of the corrective i/sld calculated prior to setting the flag f/dec to 1 is used for i/sld of the equation (40).

$$\theta i/\text{fire} = \theta 0 + i/sld - \theta dec(k) \tag{40}$$

The process proceeds to step S148, in which the value of the learning calculation end flag f/flrnend is examined. The flag f/flrnend is to be set to 1 when the FIRE mode is interrupted (step S128 of FIG. 19), when the FIRE mode is ended (step S121 of FIG. 19), or when the ignition timing flag f/dec is set to 1 (step S210 of FIG. 22). When the flag f/flrnend is zero, a basic learning corrective coefficient vpskisld is calculated in accordance with the equations (41) through (43) in step S149. The basic learning corrective coefficient vpskisld is calculated in order to determine a learning corrective coefficient kilearn.

The learning corrective coefficient kilearn is a coefficient for correcting the standard opening θ0 and is used in step S153 described later. By correcting the standard opening θ0 with the learning corrective coefficient kilearn, it is possible to determine the bypass opening θCMD that exhibits stable time-dependent changes matching the pattern of time-dependent changes of the standard opening θ0.

$$gair/sld = i/sld \frac{1}{Ne} \times Ga\,2 \tag{41}$$

-continued $$qair/sld(k) = qair/sld(k-1) + gair/sld \quad (42)$$

$$vpskisld = 1 + \frac{qair/sld(k)}{qair/cmd(k)} \quad (43)$$

gair/sld indicates a corrective quantity for the actual air intake amount corresponding to the bypass opening corrective quantity i/sld. In other words, if the bypass opening is corrected with i/sld, the intake air amount is corrected with gair/sld. Ga2 is a predetermined constant, which is the same as in the above equation (3). As shown in the equation (42), the corrective quantity gair/sld calculated by the equation (41) is added to the integrated intake air corrective quantity qair/sld(k−1) in the previous cycle to determine the integrated intake air corrective quantity qair/sld(k) for the current cycle. Based on the ratio of the integrated intake air corrective quantity qair/sld to the target integrated intake air quantity qair/cmd, the basic learning corrective coefficient vpskisld is determined as shown by the equation (43).

The process proceeds to step S150, in which a limiting process for the bypass opening preliminary value θi/fire is performed. In the limiting process, the bypass opening preliminary value θi/fire is limited between predetermined upper and lower limit values.

In step S151, the preliminary value θi/fire is multiplied by an atmospheric pressure corrective coefficient kpa, an intake air temperature corrective coefficient kta and a learning corrective coefficient kilearn, to determine the bypass opening θCMD in the current cycle.

Here, the atmospheric pressure corrective coefficient kpa is calculated in accordance with the equation (44)

$$kpa = \sqrt{\frac{Pa0 - Pb0}{Pa - Pb0}} \quad (44)$$

Pa indicates the atmospheric pressure at the start of the engine. Pa0 indicates a predetermined standard atmospheric pressure. Pb0 indicates an intake manifold pressure when the bypass opening is equalized to the standard opening θ0 under the standard atmospheric pressure Pa0. By considering the atmospheric pressure corrective coefficient kpa, variations in the intake air amount due to the atmospheric pressure can be compensated.

The intake air temperature corrective coefficient kta is calculated by referring to a pre-stored table based on the intake air temperature Ta at the start of the engine. According to the table, the corrective coefficient kta is greater as the air intake temperature is higher. This is because the atmospheric density is smaller as the intake air temperature is higher. If the atmospheric density becomes smaller, the intake air amount decreases. By considering the intake air temperature corrective coefficient kta, variations in the intake air amount due to the intake air temperature can be compensated.

Thus, variations in the actual intake air amount with respect to the bypass opening that may be caused by variations in the operation characteristics or time-dependent characteristics changes of the bypass valve are compensated with the corrective coefficients kpa, kta and kilearn, allowing appropriate bypass opening θCMD to be determined.

Returning to step S141, if the value of the FIRE permission flag f/fireon is zero, the value of the flag f/fireon in the previous cycle is examined in step S152. If the value of the flag f/fireon is 1, it indicates that the FIRE mode has been performed up to the previous cycle. Based on the basic learning corrective coefficient vpskisld determined in step S149, the corrective coefficient kilearn for correcting the bypass opening θCMD in the next FIRE mode is calculated in accordance with the equation (45) in step S153.

$$kilearn(j) = kilearn(j-1) \cdot [1 + Cki \cdot (vpskisld - 1)] \quad (45)$$

kilearn(j) indicates the learning corrective coefficient newly calculated in the current FIRE mode. kilearn(j−1) indicates the learning corrective coefficient calculated in the previous FIRE mode. Cki indicates a predetermined constant which is equal to or less than 1. The basic learning corrective coefficient vpskisld has been already calculated in the previous cycle in step S149 as described above.

If the FIRE elapsed time t/fire has not reached a predetermined value when the basic learning corrective coefficient vpskisld is determined in step S149, the current value of the learning corrective coefficient kilearn is kept. This is because the reliability of the basic learning corrective coefficient vpskisld generated when the FIRE elapsed time t/fire is short is poor. A limiting process for the calculated kilearn is performed using upper and lower limit values.

The process proceeds to step S154, in which the bypass opening θCMD is set to a bypass opening for the normal mode. The opening for the normal mode is smaller than the opening for the FIRE mode and has a value for performing the normal operation of the engine 1.

Figure 21:
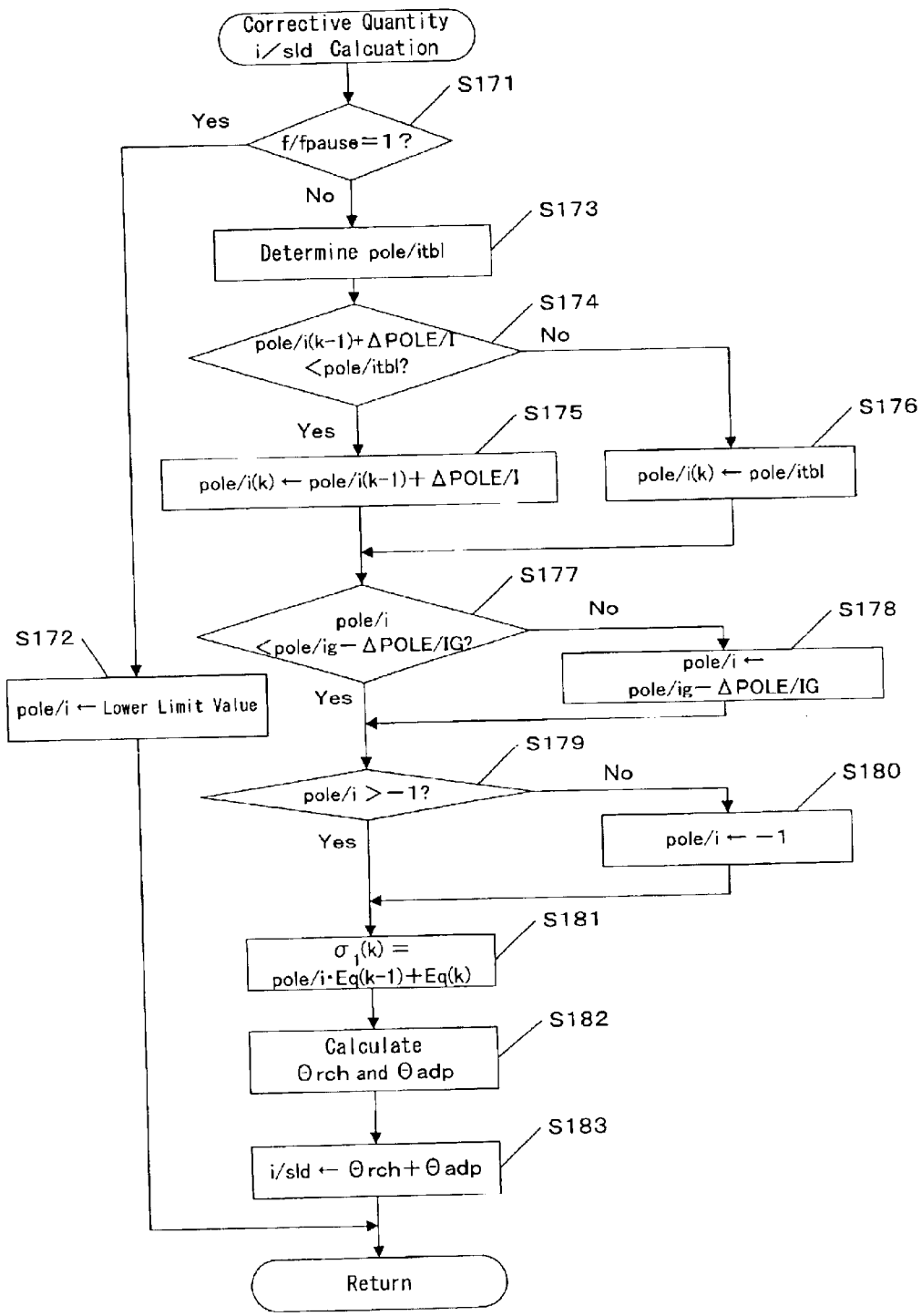
FIG. 21 shows a flowchart of a process for calculating a corrective quantity i/sld for a bypass opening in accordance with one embodiment of the invention.

FIG. 21 shows details of the routine for calculating the corrective quantity i/sld. In step S171, the value of the FIRE interruption flag f/fpause is examined. If the value is 1, it indicates that the FIRE mode is in the interrupted state. The value of the setting parameter pole/i that specifies the rate of reduction of the intake air error Eq in the sliding mode control is initialized to a predetermined lower limit value pole/i0 (S172). The value of the corrective quantity i/sld is held at the value before the interruption.

If the value of the interruption flag f/fpause is zero, it indicates that the FIRE mode is being performed. In steps S173 through S176, the setting parameter pole/i(k) for the current cycle is calculated. Specifically, a pre-stored table is searched based on the FIRE elapsed time t/fire to determine a basic value pole/itbl for the setting parameter (S173).

When the interruption operation is performed, the setting parameter is set to the lower limit value pole/i0 as described above. In this case, the value of the setting parameter needs to be gradually returned to the basic value pole/itbl. To this end, it is determined whether a value obtained by adding a predetermined value ΔPOLE/I to the current setting parameter pole/i(k−1) is smaller than the basic value pole/itbl (S174). If the determination is YES, the setting parameter pole/i(k) for the current cycle is set to the value obtained by adding ΔPOLE/I to the current setting parameter pole/i(k−1) (S175). If the determination is NO, the setting parameter for the current cycle pole/i(k) is set to the basic value pole/itbl (S176).

Steps S177 and S178 show a process for adjusting a relationship between the setting parameter value pole/i used in the sliding mode control for the intake air amount control and the setting parameter value pole/ig used in the frequency-shaping sliding-mode control (or the linear transformation type of frequency-shaping sliding-mode control) for the rotational speed control. Although both control processes are performed independently each other, both control processes affect the engine rotational speed.

Generally, the response of a change in the intake air amount with respect to a change in the bypass opening is slower than the response of a change in the rotational speed Ne with respect to a change in the ignition timing. If the rate of reduction of the intake air amount error Eq is faster than the rate of reduction of the rotational speed error En, both control processes interfere with each other, making the rotational speed unstable. Therefore, both setting parameters are adjusted so that the rate of reduction of the intake air amount error Eq is slower than the rate of reduction of the rotational speed error En.

In the example, the setting parameters pole/i and pole/ig are established to satisfy −1<pole/i<0 and −1<pole/ig<0. In step 177, if the setting parameter pole/i related with the intake air amount control is equal to or greater than a value obtained by subtracting a predetermined amount ΔPOLE/IG (>0) from the setting parameter pole/ig related with the rotational speed control, the value of the setting parameter pole/i related with the intake air amount control is reset to "pole/ig−ΔPOLE/IG" (S178).

In step S179, the value of the setting parameter pole/i is compared with "−1". If the value of the setting parameter pole/i is equal to or less than "−1", the value of the pole pole/i is forcibly reset to "−1" (S180).

In step S181, the switching function $\sigma_1$ for the intake air amount control is established as shown in the above equation (6) to determine the value of the switching function $\sigma_1$. In step S182, the reaching law input Θrch and the adaptive law input Θadp are calculated in accordance with the above equations (10) and (11), respectively. In step S183, the reaching law input Θrch and the adaptive law input Θadp are added to determine the corrective quantity i/sld.

Ignition Timing Calculation Routine

Figure 22:
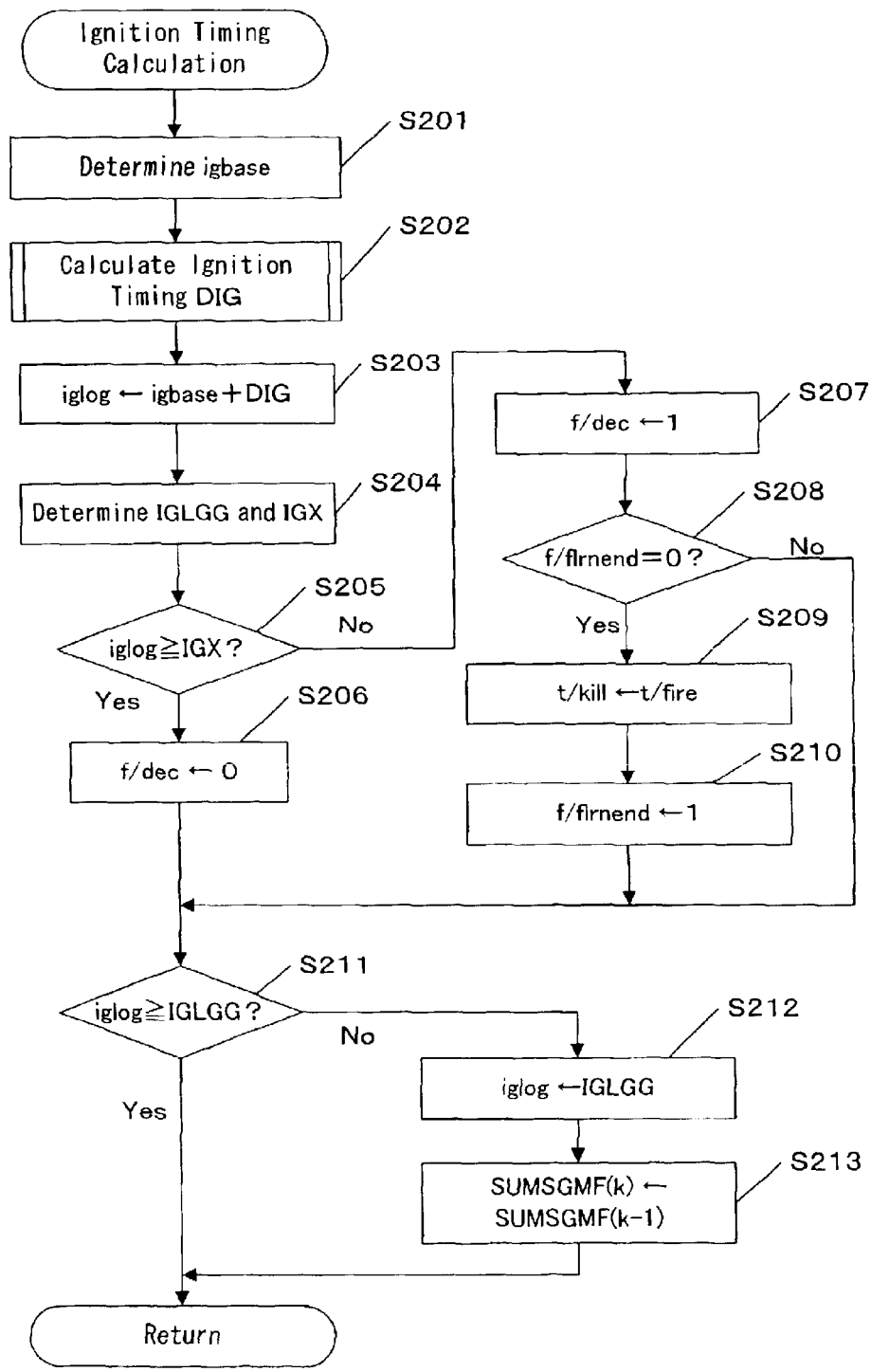
FIG. 22 shows a flowchart of a process for calculating ignition timing iglog in accordance with one embodiment of the invention.

FIG. 22 shows a flowchart of a process for calculating the ignition timing iglog, which is performed in step S106 of FIG. 18. In step S201, a basic value igbase for the ignition timing is determined. The basic value igbase may be determined from the rotational speed Ne, the intake manifold pressure Pb, the engine temperature Tw, and the atmospheric temperature Ta, etc according to pre-stored tables and expressions. In step S202 a routine for determining the ignition timing corrective quantity DIG (FIG. 23) is performed.

In step 203, the corrective quantity DIG is added to the basic value igbase to determine the ignition timing iglog. In step S204, a retarded limit value IGLGG and a threshold value IGX for the ignition timing are determined. The limit value IGLGG may be determined by referring to a pre-stored table based on the engine water temperature Tw. The limit value IGLGG is established so that the engine normally operates at any ignition timing greater than the limit value. Specifically, the limit value IGLGG is a constant value when the engine water temperature Tw is within a normal temperature range. The limit value is set to be more advanced than the constant value when the engine water temperature is within a rather lower temperature range. The threshold IGX is set to a value obtained by adding a predetermined value to the limit value IGLGG.

In step S205, the ignition timing iglog determined in step S203 is compared with the threshold IGX. When the ignition timing iglog is equal to or more advanced than the threshold IGX (that is, iglog≧IGX), the ignition timing flag f/dec is set to zero, disabling the process (step S146 of FIG. 20) for making the ignition timing more advanced (S206). When the ignition timing iglog is more retarded than the threshold IGX (that is, iglog<IGX), the flag f/dec is set to 1, enabling the process performed in step S146 of FIG. 20 (S207).

The process proceeds to step 208, in which the value of the learning calculation end flag f/flrnend is examined. If the flag f/flrnend is zero, the current value of the FIRE elapsed time t/fire is set in the learning end time t/kil (S209).

Furthermore, the value of the flag f/flrnend is set to 1 so that the calculation of the basic learning corrective coefficient vpskisld is ended (S210). This is because the corrective quantity i/sld is not determined when the flag f/dec is set to "1" (see steps S145 and S146 of FIG. 20).

In step S211, the ignition timing iglog and the limit value IGLGG are compared. If the ignition timing iglog is smaller than the retarded limit value IGLGG, it indicates that the ignition timing iglog is retarded beyond the limit value IGLGG. In this case, the ignition timing iglog is forcibly set to the limit value IGLGG (S212). Furthermore, the integrated value SUMSGMF of the switching function $\sigma_2$ for the rotational speed control is returned to the integrated value determined in the previous cycle. This is because if the calculation of the corrective quantity DIG is continued under the condition where the ignition timing iglog has been forcibly set to the limit value IGLGG, the integrated value SUMSGMF becomes excessively large, reducing the reliability of the adaptive law input.

Figure 23:
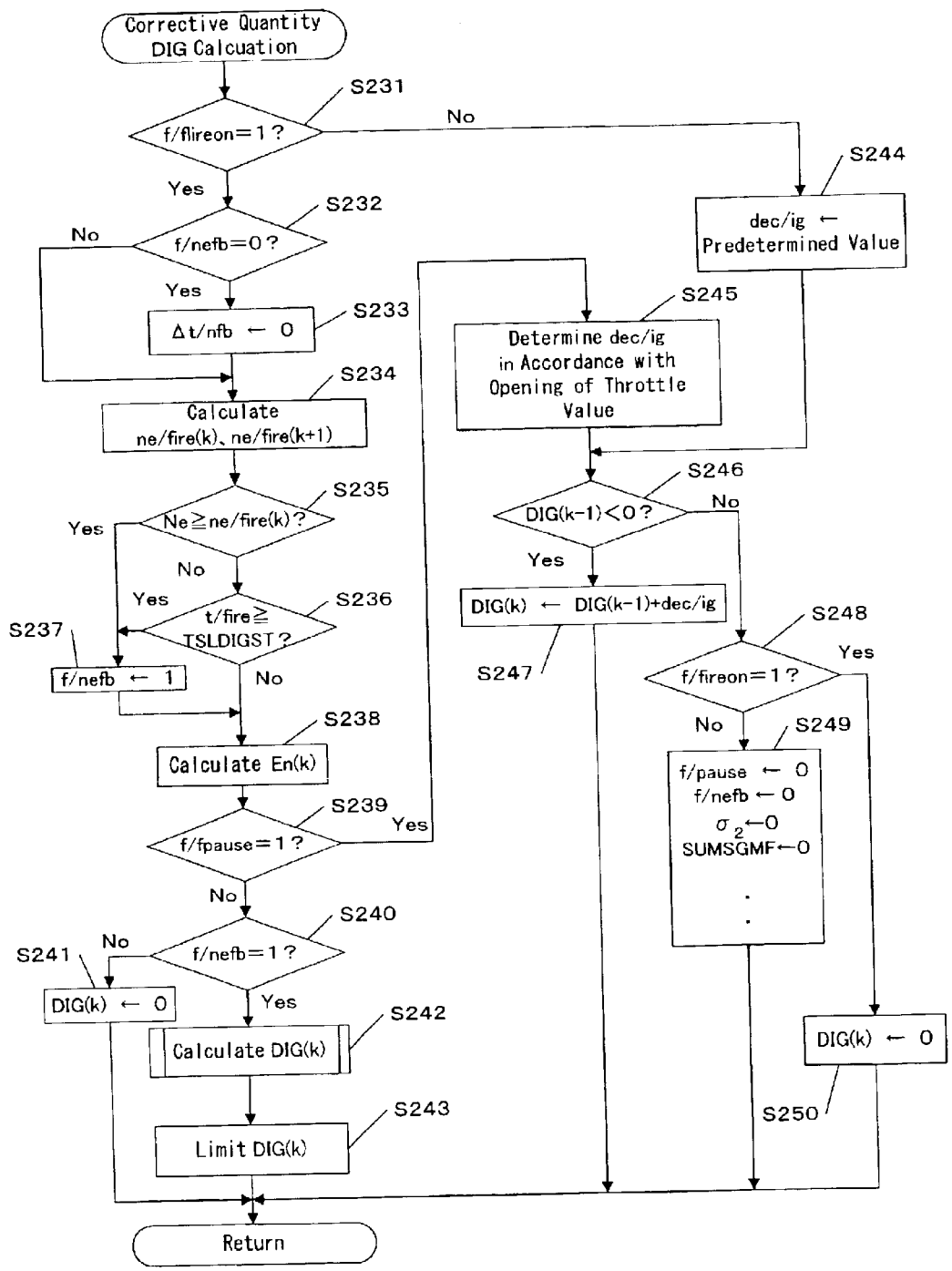
FIG. 23 shows a flowchart of a process for calculating a corrective quantity DIG for ignition timing in accordance with one embodiment of the invention.

FIG. 23 is a flowchart of a process for calculating the corrective quantity DIG for the ignition timing, which is performed in step S202 of FIG. 22. In step S231, the FIRE permission flag f/fireon is examined to determine whether the FIRE mode is being performed. If the value of the flag f/fireon is 1, it indicates that the operation mode is the FIRE mode. In step 232, a rotational speed control permission flag f/nefb is examined. If the flag f/nefb is zero, an elapsed time Δt/nfb of the rotational speed control is set to zero (S233) because, in such a situation, the rotational speed control should not be performed. (The flag f/nefb has been initialized to zero in the start mode process in step S102 of FIG. 18.)

In step S234, the target rotational speed ne/fire(k) in the current cycle is determined according to the equation (46).

$$ne/fire(k) = NOBJ + NEFSLDS - K/NE \cdot \Delta t/nfb \quad (46)$$

$$\text{if } \Delta t/nfb \geq \frac{NEFSLDS}{K/NE},$$

then $ne/fire(k+1) = NOBJ$

K/NE indicates a constant value (>0) that defines the degree at which the target rotational speed ne/fire decreases with time (gradient). When the calculated result of the right-hand side of the equation (46) is lower than the final target rotational speed NOBJ that is set for the idling operation (that is, Δt/nfb>NEFSLDS/K/NE), the target rotational speed ne/fire is fixed to the final target target rotational speed NOBJ.

As indicated by the equation (46), after the rotational speed F/B control has been started, the target rotational speed ne/fire gradually decreases linearly toward the final target rotational speed NOBJ. After the target rotational speed ne/fire has reached the final target rotational speed NOBJ, ne/fire is held at the final target rotational speed NOBJ.

In the embodiment, since one cycle (that is, one TDC) is inversely proportional to the rotational speed Ne, one cycle time ΔT is represented by 1/Ne. Therefore, the rotational speed control elapsed time in the next cycle is determined by adding one cycle time ΔT to the rotational speed control elapsed time Δt/nfb in the current cycle. Thus, the target rotational speed for the next cycle ne/fire(k+1) is calculated as shown in the equation (47).

$$ne/fire(k+1) = NOBJ + NEFSLDS - K/NE \cdot (\Delta t/nfb + \Delta T) \quad (47)$$

$$\text{if } (\Delta t/nfb + \Delta T) \geq \frac{NEFSLDS}{K/NE}$$

$$\text{then } ne/fire(k+1) = NOBJ$$

It should be noted that, while the rotational speed control elapsed time Δt/nfb is being set to zero in step S233, the target rotational speed ne/fire(k) in the current control cycle is equal to the above-described preset rotational speed (NOBJ+NEFSLDS).

In step S235, it is determined whether the current actual rotational speed Ne is equal to or higher than the current target rotational speed ne/fire(k). In step S236, it is determined whether the FIRE elapsed time t/fire is equal to or greater than a predetermined value TSLDIGST. When either of the determinations of step S235 and step S236 is YES, the rotational speed control permission flag f/nefb is set to "1" (S237). When both of the determinations in step 235 and step S236 are NO, the flag f/nefb is held at zero. After the flag f/nefb has been set to "1", the flag f/nefb will not be returned to zero during the FIRE mode.

In step S238, the rotational speed error En(k) is calculated according to the equation (48).

$$En(k) = \text{Current Rotational Speed } Ne - \text{Current Target Rotational Speed } ne/\text{fire}(k) \quad (48)$$

In step S239, the value of the FIRE interruption flag f/fpause is examined. If the value is zero, it indicates that the FIRE mode is not being interrupted. If the value is 1, it indicates that the FIRE mode is being interrupted. In step S240, the value of the rotational speed control permission flag f/nefb is examined. If the value of the flag f/nefb is 1, it indicates that the rotational speed control is being performed. If the value of the flag f/nefb is zero, it indicates that the rotational speed control process is not being performed.

If the value of the flag f/nefb is zero, the corrective quantity DIG(k) is set to zero (S241). If the value of the flag f/nefb is 1, a routine (FIG. 24) for calculating the corrective quantity DIG(k) is performed (S242). In step S243, a process for limiting the corrective quantity DIG(k) determined in step S242 between predetermined upper and lower limit values.

If the value of the FIRE interruption flag f/fpause is 1 in step S239, the process proceeds to step S245 to perform a process for interrupting the rotational speed control. In step S245, in order to gradually return the ignition timing iglog to the basic value igbase, a returning unit value dec/ig (>0) for defining the amount by which the ignition timing is returned in each control cycle is determined. The returning unit value dec/ig is set to a value proportional to the opening of the throttle valve. Since the interruption is performed when, for example, the accelerator pedal is depressed, it is preferable to return the ignition timing as quickly as possible to the normal ignition timing (namely, the basic value igbase) to keep a desired power output capability of the engine 1. Therefore, the returning unit value dec/ig is determined in accordance with the opening of the throttle valve. In step 231, if the value of the FIRE permission flag f/fireon is zero (that is, the FIRE mode operation is not being performed), the returning unit value dec/ig is set to a predetermined value (S244).

In step S246, it is determined whether the current value of the corrective quantity DIG (that is, the corrective quantity DIG(k–1) determined in the previous cycle) is smaller than zero. In other words, it is determined whether the current value of the corrective quantity DIG has a retarded value. If DIG(k–1) has a retarded value, the returning unit value dec/ig is added to the current corrective quantity DIG(k–1) calculated in the previous cycle to determine the corrective quantity DIG(k) for the current cycle (S247). It is preferable that an upper limit value for the corrective quantity DIG(k) is set to zero. If the calculated DIG(k) exceeds the upper limit value, the corrective quantity DIG(k) is forcibly set to zero.

In step 246, if the value of the current corrective quantity DIG is equal to or more than zero, the value of the FIRE permission flag f/fireon is examined (S248). If the value of the flag is 1, it indicates that the FIRE mode is being interrupted. In this case, the current corrective quantity DIG(k) is set to zero (S250). If the value of the flag is zero, it indicates that the FIRE mode is ended. Therefore, the FIRE interruption flag f/fpause and the rotational speed control permission flag f/nefb are reset to zero. The corrective quantity DIG(k), the switching function $\sigma_2$ and the integrated value SUMSGMF of the switching function are also initialized to zero (S249). When the rotational speed control is based on the above first embodiment, the values of the equivalent control input Ueq, the reaching law input Urch and the adaptive law input Uadp are initialized to zero.

Figure 24:
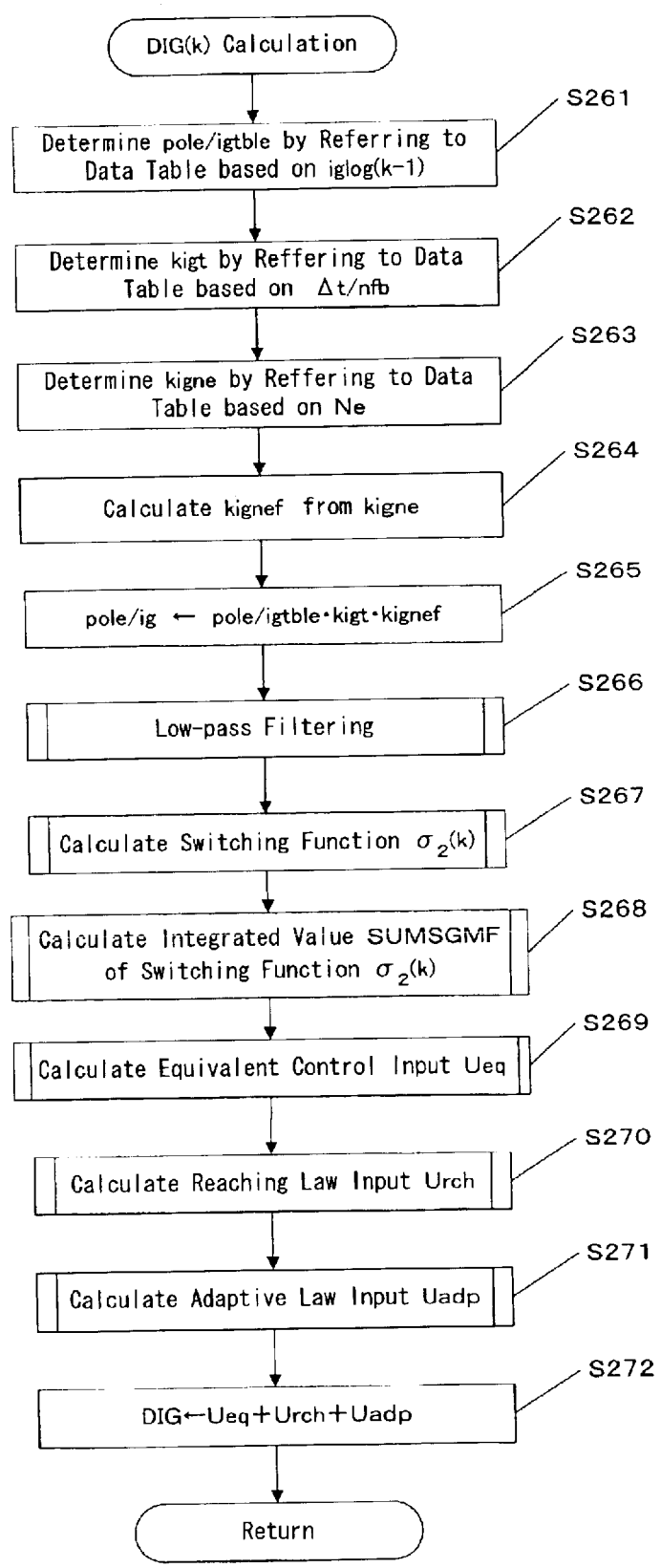
FIG. 24 shows a flowchart of a detailed process for calculating a corrective quantity DIG for ignition timing in accordance with one embodiment of the invention.

FIG. 24 is a flowchart showing details of a process for calculating the corrective quantity DIG(k) in the current cycle, which is performed in step S242 of FIG. 23. The process shown in FIG. 24 is based on the rotational speed control according to the first embodiment shown in FIG. 10.

Figure 25:
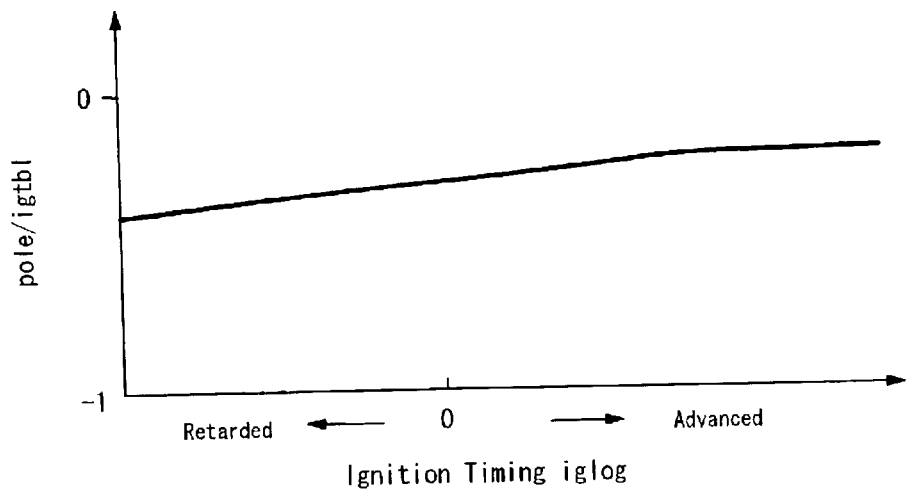
FIG. 25 shows a table used to determine a basic value pole/ig of a setting parameter of a switching function in rotational speed control in accordance with one embodiment of the invention.

In step S261, the basic value pole/igtbl is determined by referring to a pre-stored table based on the current ignition timing iglog(k–1) calculated in the previous cycle. An example of the table is shown in FIG. 25. As shown, the absolute value |pole/igtbl| of the basic value is greater as the ignition timing iglog is more retarded (however, –1<pole/igtbl<0). A change in the rotational speed with respect to a change in the ignition timing tend to be greater as the ignition timing is more retarded. Accordingly, the table is established so that the rate of reduction of the rotational speed error is slower as the ignition timing is more retarded. It should be, however, noted that the rate of reduction of the rotational speed error En defined by the basic value pole/igtbl is set to be faster than the rate of reduction of the intake air amount error Eq defined by the basic value pole/itbl for the intake air amount control.

In step S262, a corrective coefficient kigt is determined by referring to a pre-stored table based on the rotational speed control elapsed time Δt/nfb. The corrective coefficient kigt is a coefficient for correcting the basic value pole/igtbl to slow down the rate of reduction of the rotational speed error En in the initial stage of the rotational speed control. Such correction allows an abrupt change in the ignition timing to be avoided when the rotational speed control process is started, preventing the combustion state of the engine 1 from deteriorating.

Figure 26:
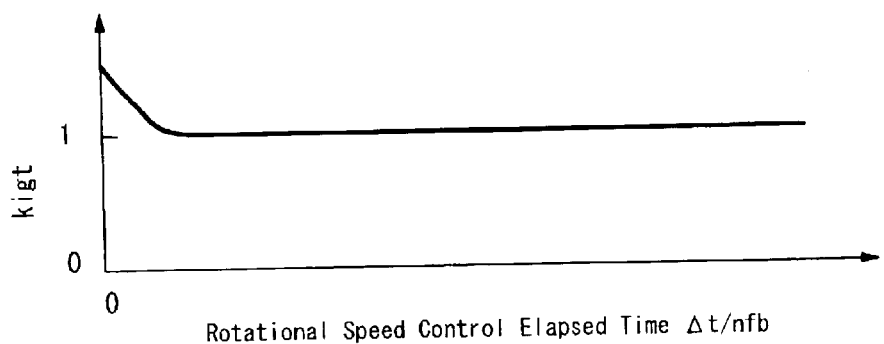
FIG. 26 shows a table used to determine a corrective coefficient kigt for correcting a basic value pole/ig of a setting parameter of a switching function in rotational speed control in accordance with one embodiment of the invention

An example of the table is shown in FIG. 26. The corrective coefficient kigt is set to a value (>1) for slightly increasing the absolute value of the basic value pole/igtbl. After the rotational speed control elapsed time Δt/nfb has reached a predetermined value, the corrective coefficient kigt is held at "1" so as to prevent the basic value pole/igtbl from being corrected.

In step S263, a corrective coefficient kigne is determined by referring to a pre-stored table based on the rotational speed Ne. The corrective coefficient kigne is a coefficient for slowing down the rate of reduction of the rotational speed error En to avoid a situation in which the corrective quantity DIG that excessively retards the ignition timing iglog is determined. Such a situation may occur when the rotational speed Ne is significantly away from the target rotational speed ne/fire (for example, when the rotational speed control is resumed after the interruption of the FIRE mode has been canceled). By considering the corrective coefficient kigne, it is prevented that the ignition timing iglog is abruptly retarded. Thus, the combustion state of the engine 1 is prevented from deteriorating.

Figure 27:
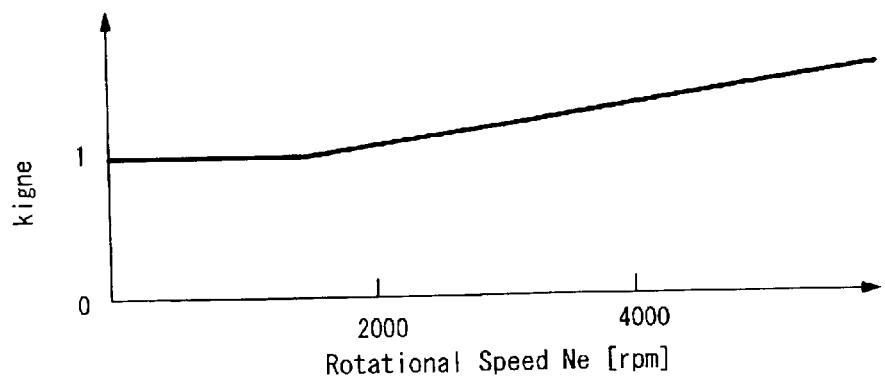
FIG. 27 shows a table used to determine a corrective coefficient kigne for correcting a basic value pole/ig of a setting parameter of a switching function in rotational speed control in accordance with one embodiment of the invention.

An example of the table is shown in FIG. 27. The corrective coefficient kigne (>1) is set to a value for increasing the absolute value of the basic value pole/igtbl as the rotational speed Ne is higher (that is, as the error between the rotational speed Ne and the target rotational speed ne/fire is greater).

In step S264, a corrective coefficient kignef is calculated based on the corrective coefficient kigne in accordance with the equation (49).

$$kignef = 1 + (kigne - 1) \cdot \frac{cnt/igvpl}{XCNT} \quad (49)$$

cnt/igvpl is a count-down timer that is set to a predetermined period XCNT at all times during the interruption of the FIRE mode. XCNT indicates an initial value (step S129 of FIG. 19). When the interruption mode is canceled, the rotational speed control is resumed and the count-down timer is started. Only during the predetermined period XCNT, the corrective coefficient determined in step S263 is modified according to the equation (49). In other words, the corrective coefficient kignef has a value ($\geq 1$) according to the rotational speed Ne until the predetermined period XCNT elapses. The corrective coefficient kignef is set to "1" after the predetermined period XCNT has elapsed. Thus, the correction according to the rotational speed is performed only during the predetermined period after the start of the rotational speed control.

In step S265, the basic value pole/igtbl is multiplied by the corrective coefficients kigt and kignef to determine the setting parameter pole/ig for the rotational speed control.

$$pole/ig = pole/igtbl \cdot kigt \cdot kignef \quad (50)$$

In step S266, a low-pass filtering process (FIG. 28) is performed to determine the internal variable Z of the low-pass filter and the filtered rotational speed error NElow as described with reference to FIG. 10. Step S266 may be performed in parallel with the calculation for the setting parameter pole/ig performed in steps S261 through S265.

In step S267, a routine (FIG. 29) for calculating the switching function $\sigma_2$ is performed. In step S268, a routine (FIG. 30) for calculating the integrated value SUMSGMF of the switching function $\sigma_2$ is performed. This calculation for the integrated value is performed so as to obtain the above-described adaptive law input Uadp.

In steps S269 through S271, the equivalent control input Ueq, the reaching law input Urch and the adaptive law input Uadp are calculated, respectively. These steps may be performed in parallel. In step S272, the equivalent control input Ueq, the reaching law input Urch and the adaptive law input Uadp calculated in steps S269 through S271 are summed to determine the corrective quantity DIG for the ignition timing.

Figure 28:
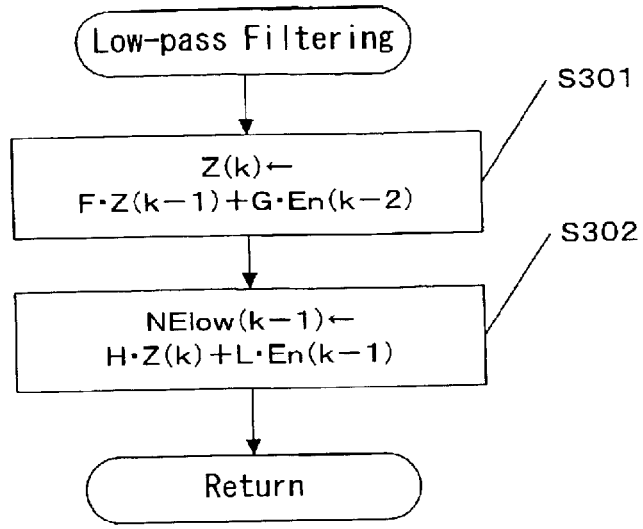
FIG. 28 shows a flowchart of a process for performing low-pass filtering in rotational speed control in accordance with one embodiment of the invention.

FIG. 28 is a low-pass filtering process performed in step S266 of FIG. 24. In step S301, the internal variable Z(k) of the filter for the current cycle is determined. Specifically, the internal variable Z(k) in the current cycle is determined based on both of the internal variable Z(k-1) calculated in the previous cycle and the rotational speed error En(k-2) calculated two cycles ago, as shown in the above equation (14).

In step S302, the filtered rotational speed error NElow(k-1) is determined based on the internal variable Z(k) in the current cycle and the rotational speed error En(k-1) in the previous cycle, as shown in the above equation (15).

Figure 29:
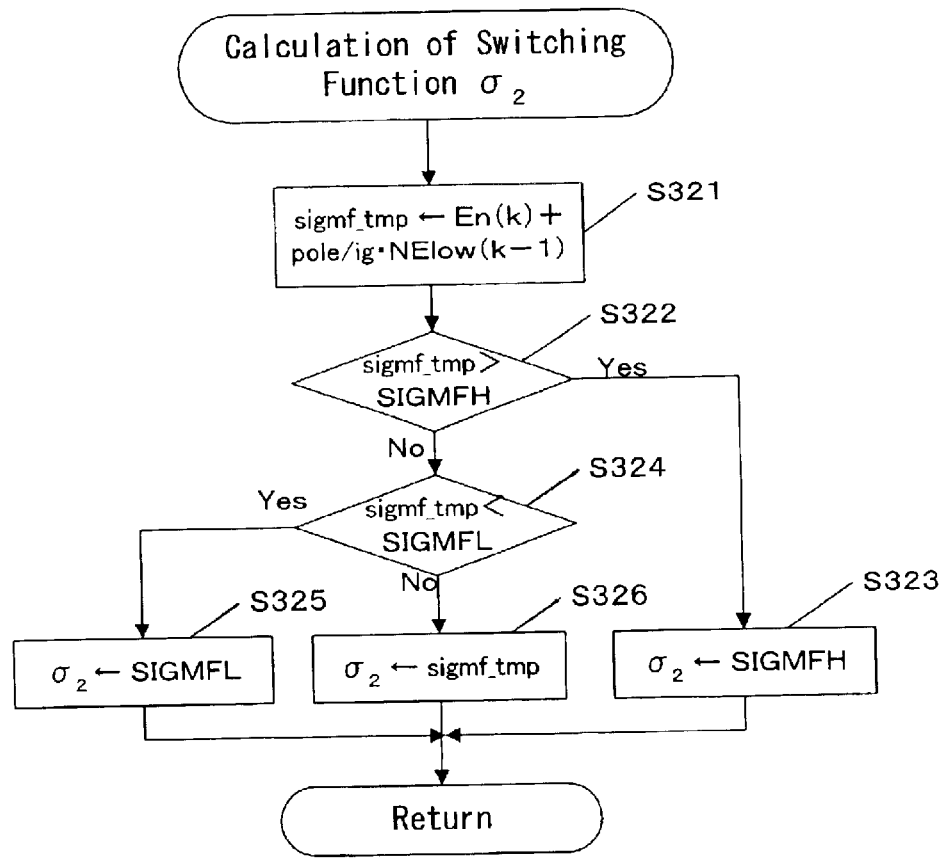
FIG. 29 shows a flowchart of a process for calculating a switching function in rotational speed control in accordance with one embodiment of the invention.

FIG. 29 shows a routine for calculating the switching function, which is performed in step S267 of FIG. 24. In step S321, the filtered rotational speed error NElow(k-1) calculated in step S302 of FIG. 28 is multiplied by the setting parameter pole/ig determined in step S265 of FIG. 24. The obtained value is added to the rotational speed error En(k) in the current cycle. The calculated result is set in a temporary variable sigmf_tmp.

Steps S322 through S326 show a limiting process for the switching function $\sigma_2$. Specifically, when the value of the temporary variable sigmf_tmp is larger than a predetermined maximum value SIGMFH, the switching function $\sigma_2$ is set to the maximum value (S323). When the value of the temporary variable sigmf_tmp is smaller than a predetermined minimum value SIGMFL, the switching function $\sigma_2$ is set to the minimum value (S325). When the value of the temporary variable sigmf_tmp is between the maximum value SIGMFH and the minimum value SIGMFL, the switching function $\sigma_2$ is set to the value of the variable sigmf_tmp (S326).

Figure 30:
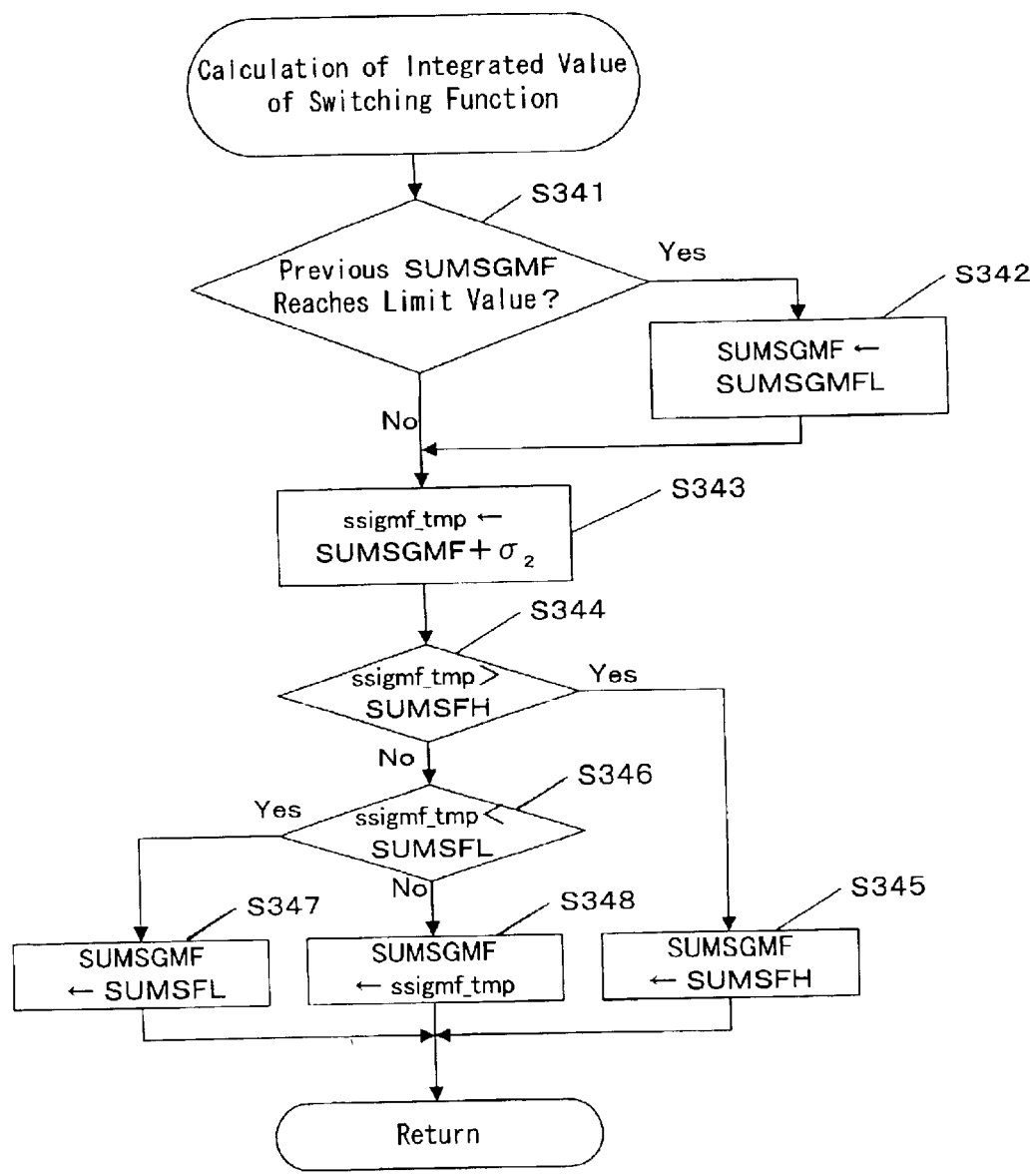
FIG. 30 shows a flowchart of a process for calculating an integrated value of a switching function in rotational speed control in accordance with one embodiment of the invention.

FIG. 30 shows a routine for calculating the integrated value SUMSGMF of the switching function, which is performed in step S268 of FIG. 24. In step S341, it is determined whether the integrated value SUMSGMF(k-1) calculated in the previous cycle reaches a predetermined limit value. When the determination is YES, the process proceeds to step S342, in which the integrated value SUMSGMF(k-1) calculated in the previous cycle is set to a predetermined value SUMSGMFL. This is because the reliability of the value of the adaptive law input may be reduced if the integrated value becomes excessively large.

In step S343, the value of the switching function $\sigma_2$ calculated in the current cycle is added to the integrated value SUMSGMF calculated in the previous cycle. The obtained value is set in a temporary variable ssigmf_tmp. Steps S344 through S348 show a limiting process for the integrated value. Specifically, when the value of the temporary variable ssigmf_tmp is larger than a predetermined maximum value SUMSFH, the integrated value SUMSGMF is set to the maximum value (S345). When the value of the temporary variable ssigmf_tmp is smaller than a predetermined minimum value SUMSFL, the integrated value SUMSGMF is set to the minimum value (S347). When the value of the temporary variable ssigmf_tmp is between the maximum value SUMSFH and the minimum value SUMSFL, the integrated value SUMSGMF is set to the value of the variable ssigmf_tmp (S348).

Figure 31:
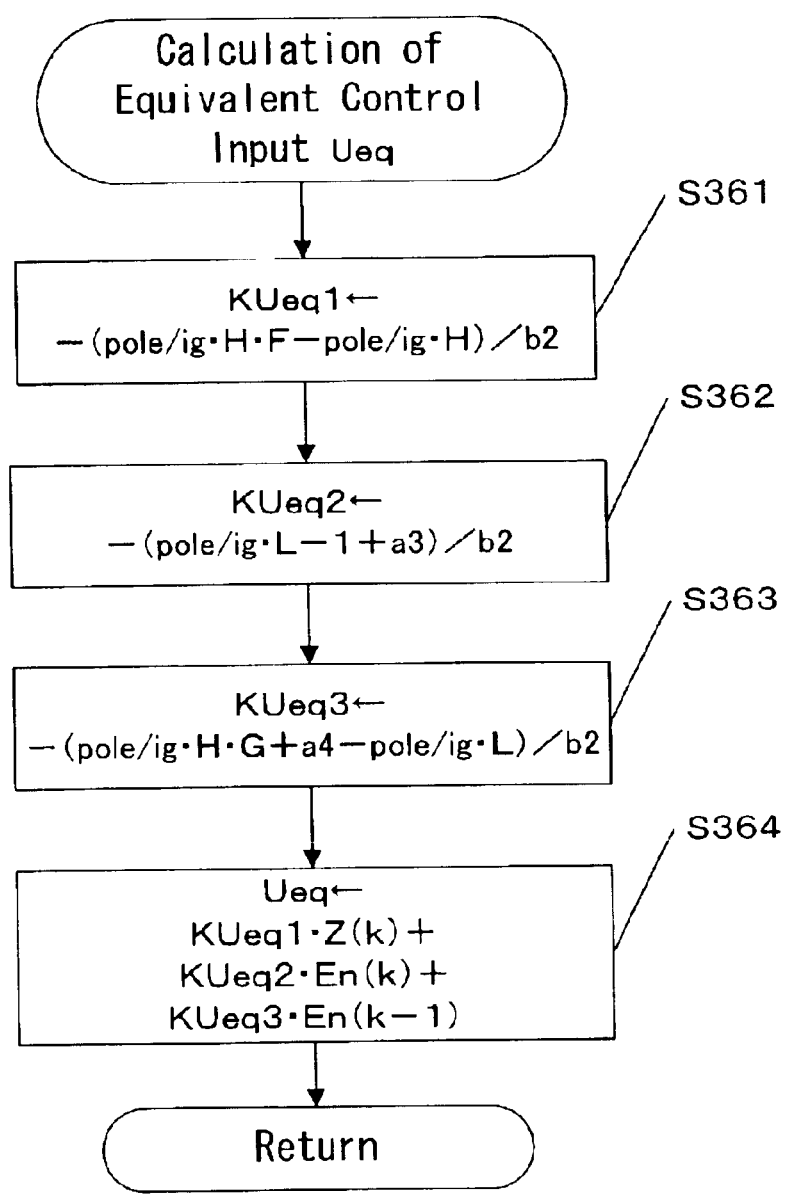
FIG. 31 shows a flowchart of a process for calculating an equivalent control input of a switching function in rotational speed control in accordance with one embodiment of the invention.

FIG. 31 shows a routine for calculating the equivalent control input, which is performed in step S269 of FIG. 24. In step S361, a coefficient KUeq1 for the term Z(k) is calculated, as shown in the above equation (22). In step S362, a coefficient KUeq2 for the term En(k) that is the rotational speed error in the current cycle is calculated, as shown in the above equation (22). In step S363, a coefficient KUeq3 for the term En(k-1) that is the rotational speed error in the previous cycle is calculated, as shown in the above equation (22).

In step S364, the equivalent control input Ueq is determined using the coefficients determined in steps S361 through S363, as shown in the above equation (22). Steps S361 through S363 may be performed in parallel.

Figure 32:
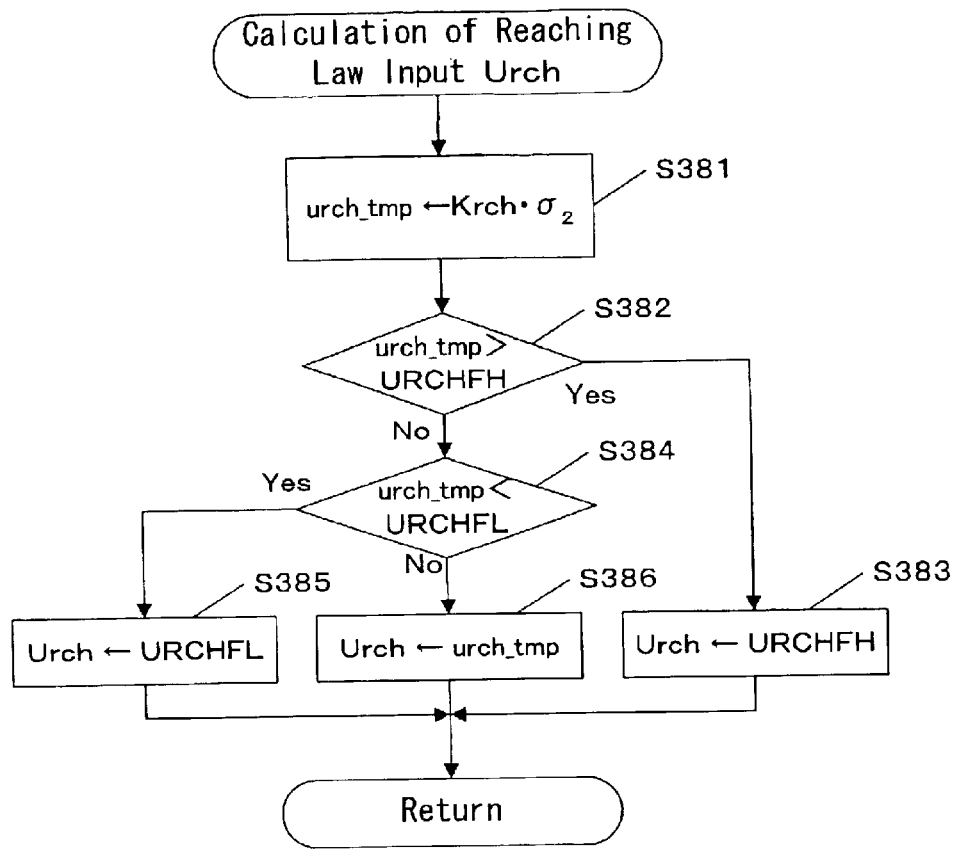
FIG. 32 shows a flowchart of a process for calculating a reaching law input of a switching function in rotational speed control in accordance with one embodiment of the invention.

FIG. 32 shows a routine for calculating the reaching law input, which is performed in step S270 of FIG. 24. In step S381, the switching function $\sigma_2$ is multiplied by the feedback gain Krch, as shown in the above equation (23). The resultant value is set in a temporary variable urch_tmp. Steps S382 through S386 show a limiting process for the reaching law input. Specifically, when the value of the temporary variable urch_tmp is larger than a predetermined maximum value URCHFH, the reaching law input Urch is set to the maximum value (S383). When the value of the temporary variable urch_tmp is smaller than a predetermined minimum value URCHFL, the reaching law input Urch is set to the minimum value (S385). When the value of the temporary variable urch_tmp is between the maximum value URCHFH and the minimum value URCHFL, the reaching law input Urch is set to the value of the temporary variable urch_tmp (S386).

Figure 33:
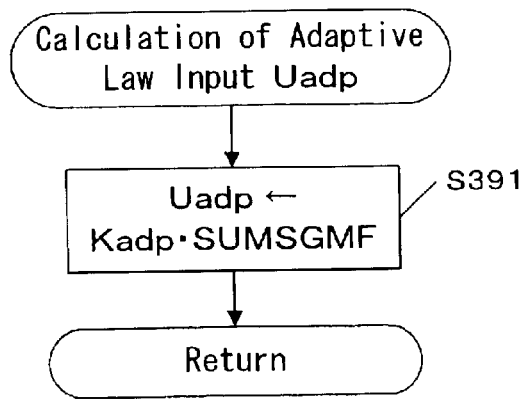
FIG. 33 shows a flowchart of a process for calculating an adaptive law input of a switching function in rotational speed control in accordance with one embodiment of the invention.

FIG. 33 shows a routine for calculating the adaptive law input, which is performed in step S271 of FIG. 24. In step S391, the integrated value SUMSGMF of the switching function $\sigma_2$ is multiplied by the feedback gain Kadp to determine the adaptive law input Uadp, as shown in the above equation (24).

Figure 34:
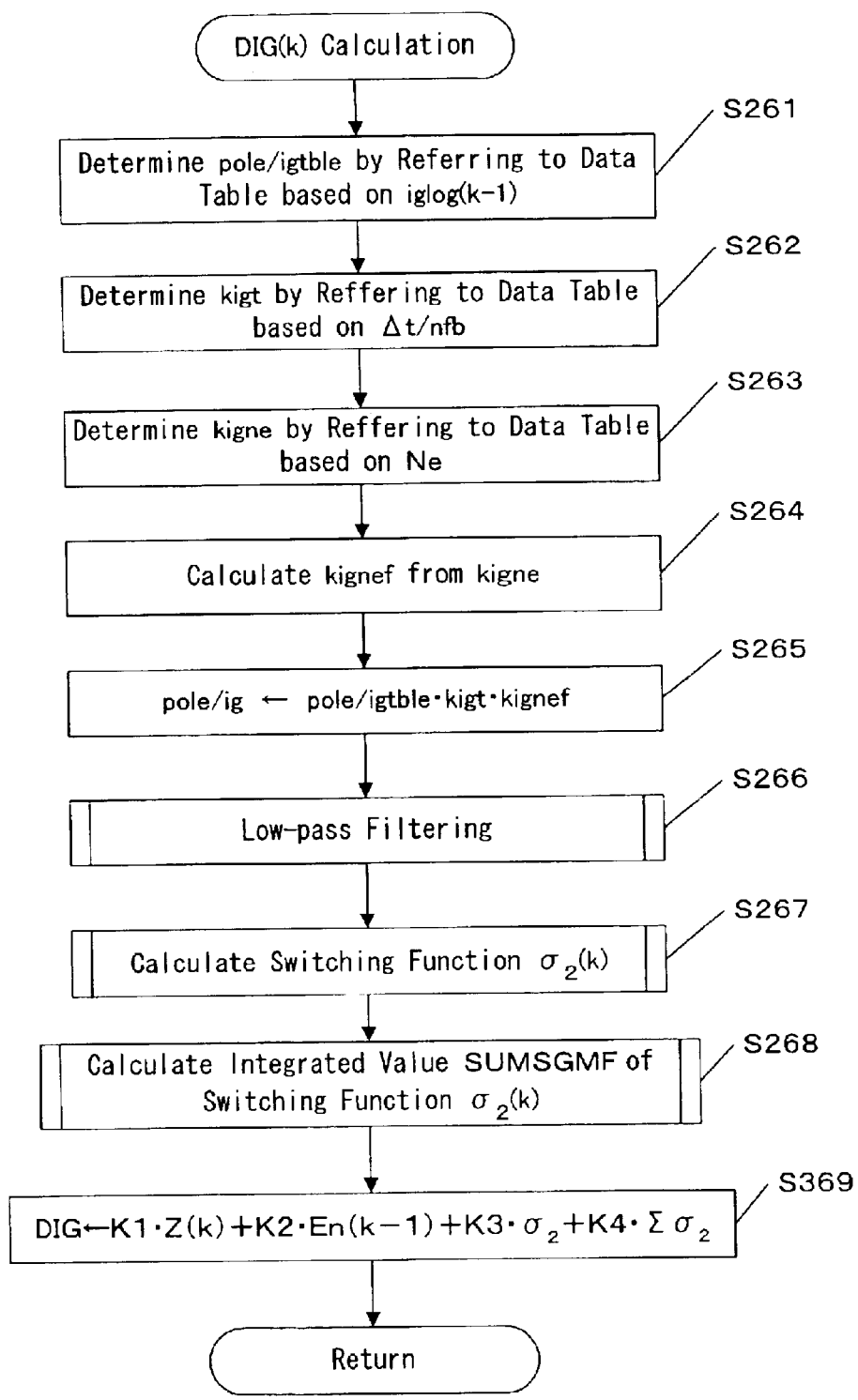
FIG. 34 shows a flowchart of a detailed process for calculating a corrective quantity DIG for ignition timing in accordance with another embodiment of the invention.
Figure 35:
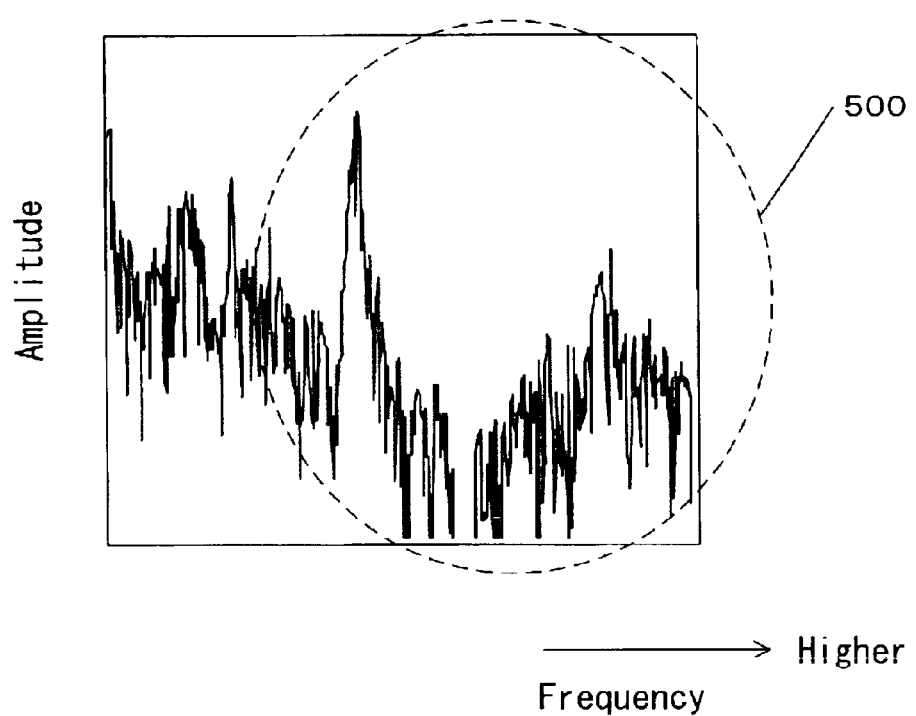
FIG. 35 shows an example of resonance which may occur in a vibration and sound transfer system between an engine and the interior of a vehicle in which the engine is mounted.

FIG. 34 is a flowchart showing details of a process for calculating the corrective quantity DIG(k) for the current cycle, which is performed in step S242 of FIG. 23. The process shown in FIG. 34 is based on the rotational speed control in accordance with the second embodiment shown in FIG. 15. Steps S261 through S268 are the same as in FIG. 24. In step S369, the ignition timing corrective quantity DIG or the control input is calculated using the correction terms K1 through K4, as shown in the above equation (35).

In the above embodiments, an object to be controlled by the intake air amount control is expressed by a discrete system model. However, it may be expressed by a continuous-system model. Furthermore, in the above embodiments, control modes of the intake air amount control and the rotational speed control are expressed by a secondary autoregressive model. However, they may be expressed by an autoregressive model of higher order. Even with such scheme, the rate of reduction of a quantity to be controlled can be designated by the setting parameter of the switching function.

Furthermore, the intake air amount control according to the invention may be applicable to any case where the intake air amount is controlled so as to cause other parameters of the engine to converge to their own target values. Similarly, the rotational speed control according to the invention may be applicable to any case where the rotational speed is controlled so as to cause other parameters of the engine to converge to their own target values.

Moreover, the frequency-shaping response-designating control and the linear transformation type of frequency-shaping response-designating control according to the invention may be applicable to any plant which is modeled in a discrete-time system. In the above embodiments, a low-pass filter is used. However, the frequency-shaping response-designating control and the linear transformation type of frequency-shaping response-designating control according to the invention may be applicable to response-designating control in which frequency shaping is performed using another type of filter such as a high-pass filter or a band-pass filter.

In the linear transformation type of frequency-shaping response-designating control, the control input may include one or more of corrective terms K1 through K4. Alternatively, the control input may include a corrective term for another quantity to be controlled. Furthermore, in order to determine the corrective terms, any appropriate scheme other than the optimum regulator may be used.

The invention may be applied to an engine to be used in a vessel-propelling machine such as an outboard motor in which a crankshaft is disposed in the perpendicular direction.

What is claimed is:

1. A controller for controlling a plant that is modeled in a discrete-time system, the controller being configured to perform a frequency-shaping response-designating control algorithm having a filtering function, the algorithm causing a difference between output of the plant and a target value to converge by using a switching function that is determined as having a state quantity, the state quantity including the difference and a filtered difference that is obtained by applying the filtering function to the difference.

2. The controller of claim 1, further comprising a filter for performing the filtering function on the difference.

3. The controller of claim 1, wherein the frequency-shaping response-designating control algorithm is a frequency-shaping sliding-mode control algorithm having the filtering function.

4. The controller of claim 2, further configured to calculate an equivalent control input term using an internal variable of the filter, the equivalent control input term being control input into the plant.

5. The controller of claim 1, further configured to calculate a reaching law input term based on a value of the switching function, the reaching law input term being control input into the plant.

6. The controller of claim 1, further configured to calculate an adaptive law input term based on an integrated value of the switching function, the adaptive law input term being control input into the plant.

7. The controller of claim 2, wherein control input into the plant includes one or more of corrective terms, the corrective terms including a corrective term for stabilizing an internal variable of the filter, a corrective term for stabilizing the difference between the output of the plant and the target value, a corrective term that varies depending on a value of the switching function, and a corrective term that varies depending on an integrated value of the switching function.

8. The controller of claim 7, wherein each of the corrective terms is determined by optimal regulator control.

9. The controller of claim 2, wherein a state equation is defined, the state equation including an internal variable of the filter, the difference between the output of the plant and the target value, and the value of the switching function as linear independent state variables, wherein corrective terms for causing the state variables to converge are determined based on the state equation, the corrective terms being control input into the plant.

10. The controller of claim 9, wherein the state equation further includes an integrated value of the switching function as a linear independent state variable.

11. The controller of claim 10, wherein each of the corrective terms is determined by optimal regulator control.

12. The controller of claim 2, wherein the plant is an engine, wherein the output of the plant is rotational speed of the engine, wherein the difference between the output of the plant and the target value is a difference between the rotational speed of the engine and a target rotational speed.

13. The controller of claim 12, wherein the plant is modeled using a corrective quantity for ignition timing of the engine as input and the rotational speed of the engine as output, wherein the controller performs the frequency-shaping response-designating control algorithm to determine the ignition timing corrective quantity.

14. The controller of claim 2, wherein the filter is a low-pass filter.

15. The controller of claim 12, wherein a cutoff frequency of the filter is set to a frequency below a resonance point of a vibration and sound transfer system between the engine and the interior of a vehicle in which the engine is mounted.

16. The controller of claim 2, wherein the filter is represented by state space representation.

17. The controller of claim 2, wherein the filter is implemented with a computer program.

18. The controller of claim 1, wherein the frequency-shaping response-designating control algorithm is implemented with a computer program.

19. The controller of claim 12, wherein the controller performs the frequency-shaping response-designating control algorithm when the engine is in an idling state.

20. The controller of claim 12, wherein the controller performs the frequency-shaping response-designating control algorithm in warm-up control for an exhaust system, the warm-up control increasing an amount of intake air introduced into the engine to quickly activate a catalyst converter immediately after a start of the engine.

21. A method for controlling a plant modeled in a discrete-time system, the method comprising performing a frequency-shaping response-designating control algorithm having a filtering function, the algorithm causing a difference between output of the plant and a target value to converge by using a switching function that is determined as having a state quantity, the state quantity including the difference and a filtered difference that is obtained by applying the filtering function to the difference.

22. The method of claim 21, wherein the filtering function is implemented with a filter.

23. The method of claim 21, wherein the frequency-shaping response-designating control algorithm is a frequency-shaping sliding-mode control algorithm having the filtering function.

24. The method of claim 22, further comprising calculating an equivalent control input term using an internal variable of the filter, the equivalent control input term being control input into the plant.

25. The method of claim 21, further comprising calculating a reaching law input term based on a value of the switching function, the reaching law input term being control input into the plant.

26. The method of claim 21, further comprising calculating an adaptive law input term based on an integrated value of the switching function, the adaptive law input term being control input into the plant.

27. The method of claim 22, wherein control input into the plant includes one or more of corrective terms, the corrective terms including a corrective term for stabilizing an internal variable of the filter, a corrective term for stabilizing the difference between the output of the plant and the target value, a corrective term that varies depending on a value of the switching function, and a corrective term that varies depending on an integrated value of the switching function.

28. The method of claim 27, wherein each of the corrective terms is determined by optimal regulator control.

29. The method of claim 22, further comprising defining a state equation, the state equation including an internal variable of the filter, the difference between the output of the plant and the target value, and the value of the switching function as linear independent state variables, wherein corrective terms for causing the state variables to converge are determined based on the state equation, the corrective terms being control input into the plant.

30. The method of claim 29, wherein the state equation further includes an integrated value of the switching function as a linear independent state variable.

31. The method of claim 30, wherein each of the corrective terms is determined by optimal regulator control.

32. The method of claim 22, wherein the plant is an engine, wherein the output of the plant is rotational speed of the engine, wherein the difference between the output of the plant and the target value is a difference between the rotational speed of the engine and a target rotational speed.

33. The method of claim 32, wherein the plant is modeled using a corrective quantity for ignition timing of the engine as input and the rotational speed of the engine as output, wherein the controller performs the frequency-shaping response-designating control algorithm to determine the ignition timing corrective quantity.

34. The method of claim 22, wherein the filter is a low-pass filter.

35. The method of claim 32, wherein a cutoff frequency of the filter is set to a frequency below a resonance point of a vibration and sound transfer system between the engine and the interior of a vehicle in which the engine is mounted.

36. The method of claim 22, wherein the filter is represented by state space representation.

37. The method of claim 22, wherein the filter is implemented with a computer program.

38. The method of claim 21, wherein the frequency-shaping response-designating control algorithm is implemented with a computer program.

39. The method of claim 32, wherein the frequency-shaping response-designating control algorithm is performed when the engine is in an idling state.

40. The method of claim 32, wherein the frequency-shaping response-designating control algorithm is performed in warm-up control for an exhaust system, the warm-up control increasing an amount of intake air introduced into the engine to quickly activate a catalyst converter immediately after a start of the engine.

41. A computer-readable medium including a computer program executable on a computer system for controlling a plant modeled in a discrete-time system, the program performing a frequency-shaping response-designating control algorithm having a filtering function, the algorithm causing a difference between output of the plant and a target value to converge by using a switching function that is determined as having a state quantity, the states quantity including the difference and a filtered difference that is obtained by applying the filtering function to the difference.

42. The computer-readable medium of claim 41, wherein the filtering function is implemented with a filter.

43. The computer-readable medium of claim 41, wherein the frequency-shaping response-designating control algorithm is a frequency-shaping sliding-mode control algorithm having the filtering function.

44. The computer-readable medium of claim 42, wherein the program further performs calculating an equivalent control input term using an internal variable of the filter, the equivalent control input term being control input into the plant.

45. The computer-readable medium of claim 41, wherein the program further performs calculating a reaching law input term based on a value of the switching function, the reaching law input term being control input into the plant.

46. The computer-readable medium of claim 41, wherein the program further performs calculating an adaptive law input term based on an integrated value of the switching function, the adaptive law input term being control input into the plant.

47. The computer-readable medium of claim 42, wherein control input into the plant includes one or more of corrective terms, the corrective terms including a corrective term for stabilizing an internal variable of the filter, a corrective term for stabilizing the difference between the output of the plant and the target value, a corrective term that varies depending on a value of the switching function, and a corrective term that varies depending on an integrated value of the switching function.

48. The computer-readable medium of claim 47, wherein each of the corrective terms is determined by optimal regulator control.

49. The computer-readable medium of claim 42, further comprising defining a state equation, the state equation including an internal variable of the filter, the difference between the output of the plant and the target value, and the value of the switching function as linear independent state variables, wherein corrective terms for causing the state variables to converge are determined based on the state equation, the corrective terms being control input into the plant.

50. The computer-readable medium of claim 49, wherein the state equation further includes an integrated value of the switching function as a linear independent state variable.

51. The computer-readable medium of claim 50, wherein each of the corrective terms is determined by optimal regulator control.

52. The computer-readable medium of claim 42, wherein the plant is an engine, wherein the output of the plant is rotational speed of the engine, wherein the difference between the output of the plant and the target value is a difference between the rotational speed of the engine and a target rotational speed.

53. The computer-readable medium of claim 52, wherein the plant is modeled using a corrective quantity for ignition timing of the engine as input and the rotation speed of the engine as output, wherein the program performs the frequency-shaping response-designating control algorithm to determine the ignition timing corrective quantity.

54. The computer-readable medium of claim 42, wherein the filter is a low-pass filter.

55. The computer-readable medium of claim 52, wherein a cutoff frequency of the filter is set to a frequency below a resonance point of a vibration and sound transfer system between the engine and the interior of a vehicle in which the engine is mounted.

56. The computer-readable medium of claim 42, wherein the filter is represented by state space representation.

57. The computer-readable medium of claim 42, wherein the filter is implemented with a computer program.

58. The computer-readable medium of claim 41, wherein the frequency-shaping response-designating control algorithm is implemented with a computer program.

59. The computer-readable medium of claim 52, wherein the frequency-shaping response-designating control algorithm is performed when the engine is in an idling state.

60. The computer-readable medium of claim 52, wherein the frequency-shaping response-designating control algorithm is performed in warm-up control for an exhaust system, the warm-up control increasing an amount of intake air introduced into the engine to quickly activate a catalyst converter immediately after a start of the engine.

* * * * *

UNITED STATES PATENT AND TRADEMARK OFFICE
CERTIFICATE OF CORRECTION

PATENT NO. : 6,950,741 B2
DATED : September 27, 2005
INVENTOR(S) : Yosuke Ishikawa and Yuji Yasui It is certified that error appears in the above-identified patent and that said Letters Patent is hereby corrected as shown below:

Column 40,
Line 47, claim 41 should read:
41. A computer-readable medium including a computer program executable on a computer system for controlling a plant modeled in a descrete-time system, the program performing a frequency-shaping response-designating control algorithm having a filtering function, the algorithm causing a difference between output of the plant and a target value to converge by using a switching function that is determined as having a state quantity, the state quantity including the difference and a filtered difference that is obtained by applying the filtering function to the difference.

Signed and Sealed this

Fourteenth Day of March, 2006

JON W. DUDAS
*Director of the United States Patent and Trademark Office*